(12) United States Patent
Friedman

(10) Patent No.: US 8,176,094 B2
(45) Date of Patent: May 8, 2012

(54) SYSTEM AND METHOD FOR EFFICIENTLY BUILDING VIRTUAL APPLIANCES IN A HOSTED ENVIRONMENT

(75) Inventor: Nathaniel Friedman, Munich (DE)

(73) Assignee: Novell, Inc., Provo, UT (US)

( * ) Notice: Subject to any disclaimer, the term of this patent is extended or adjusted under 35 U.S.C. 154(b) by 360 days.

(21) Appl. No.: 12/476,196

(22) Filed: Jun. 1, 2009

(65) Prior Publication Data

US 2009/0300057 A1 Dec. 3, 2009

Related U.S. Application Data

(60) Provisional application No. 61/057,593, filed on May 30, 2008.

(51) Int. Cl.
*G07F 17/30* (2006.01)
(52) U.S. Cl. .............................. 707/803; 719/324; 718/1
(58) Field of Classification Search .......................... None
See application file for complete search history.

(56) References Cited

U.S. PATENT DOCUMENTS

| | | | |
|---|---|---|---|
| 3,719,789 A * | 3/1973 | Harnden, Jr. ................. | 219/627 |
| 4,382,781 A * | 5/1983 | Grossman ...................... | 433/17 |
| 5,286,919 A * | 2/1994 | Benson et al. ................. | 174/50 |
| 5,743,415 A * | 4/1998 | Smart ........................... | 211/70.6 |
| 6,008,735 A * | 12/1999 | Chiloyan et al. ........... | 340/12.24 |
| 6,480,944 B2 | 11/2002 | Bradshaw et al. ............ | 711/162 |
| 6,585,774 B2 * | 7/2003 | Dean et al. ..................... | 623/37 |
| 6,587,739 B1 * | 7/2003 | Abrams et al. ................. | 700/83 |
| 6,690,400 B1 | 2/2004 | Moayyad et al. ............. | 345/779 |
| 6,718,661 B1 * | 4/2004 | Miller ............................ | 37/403 |
| 6,735,291 B1 * | 5/2004 | Schmid et al. ................. | 379/189 |
| 6,795,966 B1 | 9/2004 | Lim et al. ....................... | 718/1 |
| 6,895,491 B2 | 5/2005 | Kjos et al. ..................... | 711/203 |
| 6,944,860 B2 | 9/2005 | Schmidt ........................ | 718/100 |
| 7,072,807 B2 | 7/2006 | Brown et al. ..................... | 703/1 |
| 7,082,598 B1 | 7/2006 | Le et al. ........................ | 717/127 |
| 7,092,971 B2 | 8/2006 | Idei et al. ...................... | 707/200 |
| 7,143,398 B2 | 11/2006 | Chang et al. .................. | 717/137 |
| 7,162,719 B2 | 1/2007 | Schmidt ........................ | 718/104 |
| 7,191,440 B2 | 3/2007 | Cota-Robles et al. ........... | 718/1 |
| 7,200,530 B2 | 4/2007 | Brown et al. ..................... | 703/1 |
| 7,392,541 B2 * | 6/2008 | Largman et al. ................. | 726/17 |

(Continued)

OTHER PUBLICATIONS

"Best Practices for Building Virtual Appliances," VMWare White Paper, Nov. 15, 2007, pp. 1-7.*

(Continued)

*Primary Examiner* — Farhan Syed
(74) *Attorney, Agent, or Firm* — Pillsbury Winthrop Shaw Pittman LLP

(57) ABSTRACT

A system and method for efficiently building virtual appliances in a hosted environment is provided. In particular, a plurality of image archives may be stored in a build database, with each image archive including a file system having a directory structure and a plurality of files installed within the directory structure. In response to a build request containing an image description, a build engine may create a file system layout defining a directory structure for an image. The build engine may then copy the file system for one of the image archives to the file system layout for the image, wherein the copied file system may provide a subset of the file system for the image. The build engine may then build the image, which may include a file system having various files installed within various directories in accordance with the directory structure defined for the image.

24 Claims, 5 Drawing Sheets

U.S. PATENT DOCUMENTS

| | | | |
|---|---|---|---|
| 7,437,492 B2 * | 10/2008 | Stager et al. | 710/68 |
| 7,522,970 B2 * | 4/2009 | Fernandez | 700/132 |
| 7,533,229 B1 | 5/2009 | van Rietschote | 711/161 |
| 7,769,949 B1 * | 8/2010 | Kekre et al. | 711/114 |
| 7,788,323 B2 * | 8/2010 | Greenstein et al. | 709/204 |
| 7,864,758 B1 * | 1/2011 | Lolayekar et al. | 370/389 |
| 2002/0087806 A1 | 7/2002 | Gharachorloo et al. | 711/141 |
| 2003/0233494 A1 | 12/2003 | Ghosh et al. | 710/1 |
| 2003/0237016 A1 * | 12/2003 | Johnson et al. | 714/4 |
| 2004/0167871 A1 * | 8/2004 | Owen et al. | 707/1 |
| 2004/0193807 A1 | 9/2004 | Mogi et al. | 711/137 |
| 2004/0236874 A1 * | 11/2004 | Largman et al. | 710/8 |
| 2005/0066306 A1 | 3/2005 | Diab | 717/108 |
| 2005/0094610 A1 * | 5/2005 | de Clerq et al. | 370/338 |
| 2005/0120160 A1 | 6/2005 | Plouffe et al. | 711/1 |
| 2005/0178154 A1 * | 8/2005 | Horan | 63/3.1 |
| 2005/0183933 A1 * | 8/2005 | Vogl et al. | 198/791 |
| 2005/0193339 A1 * | 9/2005 | Meyers | 715/700 |
| 2005/0222527 A1 * | 10/2005 | Miller et al. | 602/1 |
| 2005/0268338 A1 | 12/2005 | Made | 726/24 |
| 2006/0004554 A1 | 1/2006 | Vega et al. | 703/6 |
| 2006/0010440 A1 | 1/2006 | Anderson et al. | 718/1 |
| 2006/0026387 A1 | 2/2006 | Dinechin et al. | 712/1 |
| 2006/0047974 A1 | 3/2006 | Alpern et al. | 713/191 |
| 2006/0074943 A1 | 4/2006 | Nakano et al. | 707/100 |
| 2006/0136490 A1 | 6/2006 | Aggarwal et al. | 707/103 R |
| 2006/0155749 A1 | 7/2006 | Shankar et al. | 707/102 |
| 2006/0173912 A1 | 8/2006 | Lindvall et al. | 707/104.1 |
| 2006/0224903 A1 * | 10/2006 | Ginter et al. | 713/193 |
| 2006/0256107 A1 | 11/2006 | Scarlata et al. | 345/418 |
| 2006/0294234 A1 | 12/2006 | Bakke et al. | 709/225 |
| 2007/0011273 A1 * | 1/2007 | Greenstein et al. | 709/217 |
| 2007/0033273 A1 | 2/2007 | White et al. | 709/223 |
| 2007/0112894 A1 * | 5/2007 | Okada et al. | 707/204 |
| 2007/0234337 A1 | 10/2007 | Suzuki et al. | 717/168 |
| 2007/0244906 A1 | 10/2007 | Colton et al. | 707/10 |
| 2007/0250937 A1 * | 10/2007 | Ginter et al. | 726/27 |
| 2007/0283282 A1 | 12/2007 | Bonfiglio et al. | 715/762 |
| 2007/0283324 A1 | 12/2007 | Geisinger | 717/120 |
| 2007/0294676 A1 | 12/2007 | Mellor et al. | 717/139 |
| 2008/0059957 A1 | 3/2008 | Dettinger et al. | 717/140 |
| 2008/0065691 A1 * | 3/2008 | Suitts et al. | 707/104.1 |
| 2008/0071755 A1 * | 3/2008 | Barsness et al. | 707/4 |
| 2008/0147231 A1 * | 6/2008 | Fernandez | 700/138 |
| 2009/0095028 A1 * | 4/2009 | Hoppe et al. | 68/12.04 |
| 2009/0113412 A1 | 4/2009 | Shribman et al. | 717/170 |
| 2009/0191503 A1 * | 7/2009 | Matov et al. | 433/24 |
| 2009/0249284 A1 | 10/2009 | Antosz et al. | 717/104 |
| 2009/0249287 A1 * | 10/2009 | Patrick | 717/107 |
| 2009/0300601 A1 * | 12/2009 | Faus et al. | 717/176 |
| 2010/0199261 A1 | 8/2010 | Shenfield et al. | 717/107 |
| 2010/0228996 A1 * | 9/2010 | Ginter et al. | 713/189 |
| 2011/0083122 A1 | 4/2011 | Chen et al. | 717/124 |
| 2011/0107330 A1 | 5/2011 | Freundlich et al. | 718/1 |
| 2011/0145999 A1 * | 6/2011 | Motamedi | 8/137 |

OTHER PUBLICATIONS

White Paper—"Business Case for Virtual Appliances", How Virtual Appliances Slash Costs and Drive License Revenue, © 2008, rPath, Inc., www.rpath.com, 6 pages.

White Paper by Neterion, Inc.—"The Missing Piece of Virtualization™", Eliminating the I/O Bottleneck with IOV in Virtualized Servers, Written by Philippe LEVY et al., Apr. 2008, 12 pages.

White Paper—"rPath® Versus Other Software Appliance Approaches", © 2008, rPath, Inc., www.rpath.com, 9 pages.

White Paper—"Software Appliances, Virtualization, and the Zimbra™ Collaboration Suite", Version 1.1, © 2007, Zimbra Inc., 9 pages "BMC Virtualization Management Solution Brief, Balancing Agility with Control in the Virtualized Environment", © 2008 BMC Software, Inc., Barcode No. 95159, 4 pages.

"openSUSE—KIWI Image System Cookbook", KIWI Project, Version 3.24, by Marcus Schaefer, Mar. 2, 2009, 77 pages.

"rBuilder™ and the rPath™ Appliance Platform", © 2007 rPath, Inc., www.rpath.com, 3 pages.

"rBuilder 4.1 User Guide", Version 4.1.1-2008-07-16, © 2008 rPath, Inc., www.rpath.com, 49 pages.

Virtualization: Planning the Full IT Lifecycle, White Paper Prepared for BMC Software, Apr. 2008, © 2008 Enterprise Management Associates, Inc., 12 pages.

White Paper—"Best Practices for Building Virtual Appliances", © 2008 rPath, Inc., www.rpath.com, 6 pages.

White Paper—"Virtualizing Support", Sponsored by Bomgar, by Matt Healey, Mar. 2008, © 2008 IDC, Paper No. 211403, 9 pages.

* cited by examiner

SYSTEM AND METHOD FOR EFFICIENTLY BUILDING VIRTUAL APPLIANCES IN A HOSTED ENVIRONMENT

CROSS-REFERENCE TO RELATED APPLICATIONS

This application claims the benefit of U.S. Provisional Patent Application Ser. No. 61/057,593, entitled "System and Method for Managing a Virtual Appliance Lifecycle," filed May 30, 2008, the disclosure of which is hereby incorporated by reference in its entirety.

FIELD OF THE INVENTION

The invention relates to a system and method for efficiently building virtual appliances in a hosted environment, and in particular, to storing a plurality of image archives in a build database, wherein each of the image archives may include a file system that can be copied to a file system for an image that a build engine is currently building in response to the file system being a subset of the file system for the image.

BACKGROUND OF THE INVENTION

Virtualization generally refers to the concept of running one or more virtual machines that can share resources of a physical machine across various different environments. For example, in a virtualized system, different virtual machines can execute different operating systems and/or applications on the same physical machine, regardless of underlying hardware associated with the physical machine. One advantage that virtualization can provide is the ability to create a tuned virtual appliance that includes a fully configured application image with just enough operating system (JeOS) components and/or other components needed to run a particular application. For example, an independent software vendor (ISV) may develop virtual appliances to bundle one or more applications with an operating system into a virtual machine image that can be delivered to a customer, wherein the virtual machine image may include all of the information necessary to install and configure the application. Virtualization may therefore reduce or eliminate barriers associated with different computing environments, providing ISVs with increased flexibility for reaching new markets and customers.

As such, the concept of virtualization has important implications in simplifying the production and distribution of software by reducing or eliminating the need for hardware optimization. For example, an operating system vendor may simply create a virtual appliance that includes the components of the operating system (with or without other applications), where customers may then run the operating system within a hypervisor that emulates the relevant hardware environment. Furthermore, virtual appliances may be deployed in many different ways, including in hosted environments (e.g., to deliver an application as a service), cloud computing environments (e.g., to reduce the resources needed to run an application), or various other environments. Thus, virtualization provides important advantages for ISVs that may lack particular expertise for different computing environments, as virtual appliances may provide contained systems that have been thoroughly tested and configured for a particular application. Virtual appliances may also simplify issues relating to support, security, and complexity of software products by reducing the volume of operating system components, services, and applications necessary to deliver an application to customers that may have different computational requirements.

Despite the various advantages that virtualization can provide to software providers, existing virtualization systems tend to lack a simple yet repeatable process for creating virtual appliances. For example, virtualization has faced various barriers to adoption, including the perception that specific skills are needed to develop and support virtual appliances. That is, to create a virtual appliance, developers often have to possess knowledge regarding repositories where the relevant JeOS components or other software components may be available, as well as issues pertaining to dependencies or incompatibilities among software components. Moreover, a historic problem with open source software projects is that one developer may innovate or otherwise improve upon certain aspects of a project, yet the changes that the developer implements may not necessarily be made available to upstream distributions of the project. Alternatively, the changes may not become available upstream by the time other developers have begun to work on the same features or problems. As such, existing systems for developing virtual appliances tend to lack adequate mechanisms for simplifying the management of origin repositories and relationships between software components, and further tend to lack adequate mechanisms for sharing the work and knowledge of different virtual appliance developers.

SUMMARY OF THE INVENTION

According to one aspect of the invention, a system and method for managing a virtual appliance lifecycle may address these and other drawbacks of existing systems. In particular, the systems and methods described herein may employ a hosted virtualization environment to provide a unified framework for developing, building, testing, deploying, and otherwise managing a virtual appliance lifecycle. As will be described in further detail below, integrating the functions of developing, building, testing, deploying, and otherwise managing the lifecycle of virtual appliances within the unified virtualization environment may provide various synergies. For example, the synergies provided through the integrated functions of the virtualization environment may include enabling users to follow a simple and repeatable process to build and configure a virtual appliance distribution, monitor upstream changes and modifications to virtual appliances in a collaborative and user-driven manner, and provide real-time analysis and feedback during various phases of the virtual appliance lifecycle.

According to one aspect of the invention, the virtualization environment may be provided as a hosted service, which one or more users may access to create tuned virtual appliances containing "just enough operating system" (JeOS) components to run particular applications or perform specific functions, and further to build images of the appliances that can be executed in any suitable runtime environment. In particular, the hosted virtualization environment may include a development environment that provides various features and options for developing virtual appliances. For example, the development environment may provide various JeOS templates that may be cloned to create a base appliance, thereby providing a starting point for developing a virtual appliance (e.g., the JeOS templates may generally include only the core components, packages, patterns, or other information needed to create a virtual appliance having a minimal operating system footprint). In addition, the development environment may further provide an appliance marketplace having various appliances previously developed in the virtualization environment, wherein the appliances in the appliance marketplace may be cloned in a similar manner to create the base appliance. As such, the appliance marketplace may provide a community where users can collaborate and otherwise interact to manage the lifecycle of virtual appliances. Alternatively, instead of cloning one of the JeOS templates or appliances in the appliance marketplace, a user may create an appliance from an imported configuration file providing an appliance image description (e.g., a "config.xml" file created using an image creation system, such as the openSUSE Kiwi Image System).

According to one aspect of the invention, the development environment may load an editing interface for a user to further develop an appliance cloned from a JeOS template, an appliance cloned from the appliance marketplace, or an appliance created from a predefined configuration file. For example, the user may interact with the editing interface to specify a name, narrative description, base distribution, architecture, origin, or other information for the appliance. As such, the editing interface may further enable the user to select one or more packages, patterns, files, or other software components to be included in and/or banned from the appliance.

According to one aspect of the invention, the virtualization environment may be associated with a repository metadata server that caches information associated with various origin repositories (e.g., packages, patterns, or other software contained in the origin repositories, metadata describing the origin repositories and the packages, patterns, or other software contained therein, etc.). As such, the editing interface may enable the user to interact with the repository metadata server to add, remove, update, or otherwise query any suitable information cached from or otherwise associated with the origin repositories, and the user may further interact with the repository metadata server to manage software for the virtual appliance (e.g., selecting packages, patterns, or other software to be included in and/or banned from the appliance). In addition, to assist the user in managing the software for the virtual appliance, the virtualization environment may provide various metrics derived from activity associated with other users (e.g., a popularity metric may indicate the popularity of particular packages or origin repositories among various users, a trust metric may indicate whether certain software or origin repositories are provided by a trusted source, etc.).

According to one aspect of the invention, in addition to caching information associated with the origin repositories, the repository metadata server may further discover dependency information for the origin repositories (e.g., the repository metadata server may build resolution graphs that describe dependencies for the packages, patterns, or other software in the origin repositories). In particular, the repository metadata server may include an active daemon list identifying one or more active resolution daemons associated with a dependency resolution service, wherein the repository metadata server may push the resolution graphs to the active resolution daemons in the active daemon list. Thus, the user may interact with the repository metadata server in various ways to manage software for a virtual appliance (e.g., to obtain a real-time status of the origin repositories, browse, search, or otherwise select software to be included in and/or banned from the virtual appliance, etc.), while the dependency resolution service may use the resolution graphs provided by the repository metadata server to analyze various dependencies for the software selected by the user.

According to one aspect of the invention, in response to a package or other software being added, banned, or otherwise selected for the appliance, the dependency resolution service may invoke a resolution daemon to identify any dependent, recommended, suggested, and/or conflicting software. For example, the resolution daemon may be configured to scan the resolution graphs for annotations or metadata representing explicit dependencies for the selected software, and further to scan pre-installation scripts, post-installation scripts, content, and/or documentation for implicit dependencies associated with the selected software. Thus, in response to a user adding to the appliance a particular software component requiring other components to be installed, the required components may be automatically added to the appliance, while any conflicting components previously added to the appliance may be removed to resolve the conflict. Furthermore, in response to the added component having recommended and/or suggested dependencies, the user may be notified of such dependencies to enable the user to determine whether or not to include the recommended and/or suggested dependencies, or the recommended and/or suggested dependencies may be optionally added to the appliance automatically with the user being provided with an option to override or otherwise undo the automatic addition.

According to one aspect of the invention, in response to the packages or other software being added, banned, or otherwise selected for the appliance, and further in response to one or more dependent packages being added to and/or removed from the appliance, an impact analysis engine may analyze any resulting changes to the appliance. In addition, the impact analysis engine may provide the user with an appropriate notification of the resulting changes, wherein the notification may optionally enable the user to override or otherwise undo one or more of the changes. For example, the notification provided by the impact analysis engine may include a list of packages added to and/or deleted from the appliance, a data impact on the appliance expressed in terms of megabytes, gigabytes, or other data quantities, an error correction mechanism that can be selected to resolve an error, inconsistency, or other issue, a warning relating to an error, inconsistency, or other issue that requires manual intervention to correct, an undo mechanism to remove a package that was added to the appliance, an override mechanism to add a package that was banned or deleted from the appliance, and/or other information that may be relevant to the resulting changes. As such, the impact analysis engine may provide the user with various visual notifications to assist the user in managing software for the appliance.

According to one aspect of the invention, upon the user having selected the packages, patterns, or other software components to be included in the appliance, the editing interface may further enable the user to configure a build for the appliance. In particular, the editing interface may provide various options to configure settings for locales, networks, identity management, run levels, applications, programs, services, storage, memory, and/or any other appropriate settings for the appliance and/or the software included in the appliance. In addition, the configuration options provided to the user may optionally be further customized based on metadata or other information relating to the packages or other software included in the appliance (e.g., in response to a particular package being included in the appliance, the customized configuration options may enable the user to configure specific services associated with that package). As such, the user may configure the build for the appliance such that a resulting image of the appliance and the software included therein is configured to operate in accordance with the configuration options provided by the user. Furthermore, the impact analysis engine may analyze the configuration options provided by the user to identify any changes, errors, and/or warnings associated with the configuration options (e.g., identifying a particular package required to enable a specific configuration option).

According to one aspect of the invention, upon the user having configured the appliance and/or any software having customized configuration options, the editing interface may further enable the user to personalize the build for the appliance. In particular, the editing interface may provide various options to personalize the appliance. For example, the personalization options may enable the user to add custom files or archives to the appliance, and further to specify a target path or directory where the custom files or archives are to be installed, identity management settings to control access to the custom files or archives, or various other settings for the custom files or archives. Additionally, the personalization options may further enable the user to establish graphics for logos, icons, boot screens, login backgrounds, desktop backgrounds, or other visual features for the appliance. As such, the user extend personalized branding functionality to the appliance, replace pre-existing graphics with custom graphics to "re-brand" the appliance, remove one or more of the pre-existing graphics (e.g., to comply with trademark rights), or otherwise personalize the visual features of the appliance (e.g., logos, brands, or other marks to be used on distributable media created for the appliance).

According to one aspect of the invention, the virtualization environment may further provide one or more application program interfaces to enable users, third-party developers, or other entities to develop custom plug-ins or applications for the virtualization environment. For example, the custom plug-ins or applications may be designed to configure specific features associated with software, functionality, services, or other aspects of an appliance, provide customized appliance creation processes, provide social networking features (e.g., managing the appliance marketplace, relationships among users, etc.), or otherwise modify any suitable functionality that may be provided in the virtualization environment. Thus, the application program interfaces may enable developers to add, extend, or otherwise modify various features and functions of the virtualization environment, thereby leveraging collective knowledge that may be held within a development community and enabling the virtual appliance lifecycle to be managed in a customized and personalized manner (e.g., as described in further detail in U.S. patent application Ser. No. 12/476,144, entitled "System and Method for Managing a Virtual Appliance Lifecycle," filed on an even date herewith, the disclosure of which is hereby incorporated by reference in its entirety).

According to one aspect of the invention, the virtualization environment may further include a build engine, which may be configured to build images (e.g., operating system images) of appliances that the user created, configured, personalized, and/or otherwise developed within the development environment. In particular, the build engine may generally build images that provide fully configured systems ready to execute the software that the user has installed for the appliance in response to being deployed to a runtime environment.

According to one aspect of the invention, the build engine may be invoked in response to receiving a build request from a user, wherein the build request may generally include an image description for the appliance (e.g., installed software, source repositories for the software, configurations for the software and/or the appliance, etc.). In addition, the build request may further include an image format (e.g., a disk image, a live CD/DVD image, a virtual machine image, etc.). The image description may be validated to identify the appropriate information needed to build the image (e.g., origin repositories containing the software, directory structures, etc.). In response to the image description containing any errors or other invalid information, the user may be provided with a warning and/or an option to resolve the errors (e.g., installing a package required for a specific software configuration).

According to one aspect of the invention, the build engine may be launched in response to the image description being validated. In particular, launching the build engine may include loading a virtual machine from a virtual machine pool to create a contained environment for building the image, wherein the contained environment may enable the build engine to build various images corresponding to various different appliances in a substantially simultaneous and independent manner. The build engine may then analyze the image description and create a physical extend based on the image description within the contained build environment (e.g., a file system layout having a directory structure and a file layout). In response to successfully creating the physical extend and the corresponding file system layout, the image (or logical extend) may be created from the physical extend. For example, creating the image may generally include retrieving the files to be installed from an appropriate source repository and then copying the files to the image in accordance with the file system layout. As such, the image may comprise one file encapsulating all of the software selected for the appliance installed according to the file system layout, with the image being further configured and personalized according to any parameters that the user may have provided for the appliance.

According to one aspect of the invention, the build engine may monitor the build for the image, whereby the build engine may be further configured to generate one or more logs describing the build process. In addition, the build engine may display the current status for the build within a user interface (e.g., an elapsed time, a progress bar, a current process being executed, etc.). As such, in response to the build process completing (whether successfully or unsuccessfully), one or more build logs may be generated to provide a record describing the various processes executed during the build, any errors, problems, or other status changes that occurred during the build, any files or other information referenced to create the image, or any or other information describing the build process.

According to one aspect of the invention, an appliance family tree may be constructed in response to the image having been built for an appliance that was created from a cloned appliance (e.g., a JeOS template, an appliance previously created by the user, an appliance published in the appliance marketplace, etc.). In particular, as noted above, the virtualization environment may provide an appliance marketplace within a panel or other interface that can be browsed and/or searched for various appliances that users of the virtualization environment have made publicly available. As such, various relationships between the cloned appliance and the image derived from the cloned appliance may be analyzed to construct the family tree. For example, the family tree may represent links between the cloned appliance and any appliances derived from the cloned appliance according to a hierarchy, and changes or other differences among the linked appliances may be represented along branches of the hierarchy, thereby enhancing the information provided in the appliance marketplace. Thus, the appliances linked to one another in the family tree may be analyzed according to one or more data mining algorithms, heuristic algorithms, and/or other analytic techniques to derive knowledge relating to the changes or other differences among the appliances (e.g., defining clusters of derived appliances that incorporate similar changes to a cloned appliance, identifying "best changes," "recommended changes," and/or "popular changes," etc.).

According to one aspect of the invention, the virtualization environment may further enable the user to manage publication of the image. In particular, a publication prompt may be presented to the user that created the appliance, wherein the publication prompt may enable the user to establish whether or not the image of the appliance is to be made publicly visible. Thus, in response to the user indicating that the appliance is to be published, the image may be added to the appliance marketplace, thereby enabling other users to view and optionally clone the published appliance. Alternatively, in response to the user not publishing the appliance, the image will not be visible to other users of the virtualization environment (although the unpublished image may be made visible to one or more limited users, such as other users in a friend list for the user, other users that created earlier generations of the unpublished appliance, and/or other users that created appliances in the same family tree as the unpublished appliance). In either case, the image may be added to the user's appliances, wherein the user may be provided with various options to manage the user's appliances (e.g., viewing information describing the appliances, deleting, downloading, cloning, publishing, deploying, and/or otherwise managing any of the appliances, etc.).

According to one aspect of the invention, the build engine may be further configured to store various reusable image archives in a build database, wherein the reusable archives may provide pre-built appliance subsets for efficiently building virtual appliances in a hosted environment. In particular, in response to receiving a build request that includes an image description for a virtual appliance, the build engine may analyze the image description to identify the various packages, patterns, and other software components installed for appliance, the source repositories containing the packages, patterns, and other software components installed for appliance, and any configuration and/or personalization options to be applied to the appliance. As such, building the image for the appliance may begin with building a file system for the appliance, wherein the file system may generally include a directory structure defining a layout for all of the directories and sub-directories for the appliance. In addition, the directory structure may further define a layout for all of the files to be installed for the appliance and locations within the directory structure where such files are to be installed. The build engine may then determine whether any of the reusable image archives in the build database can be used to provide a pre-built appliance subset for the current image being built. For example, in response to successfully creating the file system for a particular image and copying all of the files to the image in accordance with the directory structure layout, the build engine may create a reusable archive from the file system (e.g., the reusable archive may be a tarball that collects all of the files installed for the image within one file, while preserving information relating to the file system). The build engine may therefore create various reusable archives in response to successfully creating corresponding images, wherein the reusable archives may be stored in the build database coupled to the build engine.

According to one aspect of the invention, each of the packages, patterns, and other software components installed for the appliance may be associated with a current version, which may be described in metadata (e.g., a unique MD5 identifier). As such, each of the reusable archives in the build database may be associated with a manifest file listing of all of the packages, patterns, and other software components installed for the appliance. Accordingly, the build engine may reference the manifest files for the various reusable archives to determine whether any of the reusable archives are a perfect subset of the current image that the build engine is building. In particular, a given reusable archive may be a perfect subset of the current image if every file installed in the reusable archive is to be installed for the current image.

According to one aspect of the invention, in response to determining that one or more of the reusable archives provide a pre-built appliance subset for the current image, a largest one of the reusable archives may then be added to the current image. In particular, the largest subset may accelerate the build for the current image in an optimally efficient manner, such that adding the largest reusable archive that is a perfect subset provides the largest efficiency to the hosted build process. If any additional files remain to be installed after the largest reusable archive has been added to the image (or alternatively if none of the reusable archives are a perfect subset of the current image), the additional files may then be added to the image. The build engine may then update the build database in response to successfully building the current image, wherein updating the build database may include archiving the file system for the current image and adding the archived file system to the reusable archives in the build database. As such, the archived file system for the current image may then be used to efficiently build subsequent images for which the archived file system is a perfect subset (e.g., subsequent versions of the appliance that have one or more additional packages installed).

According to one aspect of the invention, the techniques described above for using reusable image archives to efficiently build an appliance image may be similarly employed to efficiently build boot images that are associated with the appliance image. In particular, any particular appliance image may generally include an operating system image and a boot image, wherein the boot image can be used to load the operating system image in a suitable runtime environment. Thus, the build engine may create and reference reusable boot image archives in a similar manner as described above to efficiently add a boot image file system to the deployable appliance image. However, to add a reusable boot image archive, the build engine may determine whether any configuration and/or personalization options apply changes to the boot image archive and modify the boot image archive in accordance with the changes (e.g., a personalization option may apply a custom graphic that changes boot screen branding, in which case the build engine may remove any relevant boot screen graphics from the file system of the boot image and copy the custom graphic to the boot image file system to apply the personalization option changing the boot screen branding).

According to one aspect of the invention, the virtualization environment may be further configured to identify candidates for populating the build database with reusable archives. For example, the virtualization environment may analyze activity relating to cloned JeOS templates, cloned appliances in the appliance marketplace, family trees constructed for the cloned appliances, or other relevant activity to determine candidates for reusable archives that will likely be subject to frequent building. For example, popular or highly rated appliances may be identified based on various statistics, wherein reusable archives corresponding to the popular or highly rated appliances may be created to populate the build database. In particular, the popular or highly rated appliances may be likely candidates for images that the build engine creates most often, whereby using such appliances to populate the build database may be likely to improve build times for a substantial number of users. Thus, images may be built for various public appliances in a periodic manner to populate the build database with reusable archives.

According to one aspect of the invention, the virtualization environment may be further configured to query the build database at periodic intervals to identify any of the reusable archives that can be deleted (e.g., archives that have not been referenced for a given amount of time). In addition, the build database may be further queried to identify any reusable archives that need to be modified. For example, as noted above, the reusable image archives may be associated with a manifest file that includes a listing of the packages, patterns, and other software components installed for the appliance, in addition to corresponding unique identifiers for the software components listed in the manifest file. Thus, in response to the repository metadata server detecting an upstream update to one or more packages, patterns, and/or other software components contained in one or more origin repositories, any reusable archives associated with the updated packages, patterns, and/or other software components may be invalidated because such archives include outdated information. The build engine may then be invoked to rebuild such archives to incorporate the upstream updates.

According to one aspect of the invention, the virtualization environment may further include a hosted runtime environment for testing or otherwise executing virtual appliances. In particular, the hosted runtime environment may be launched in response to a request that includes an identifier for an image to be executed, wherein launching the runtime environment may include loading a virtual machine from a virtual machine pool to provide a contained runtime environment. For example, one or more of the virtual machines in the virtual machine pool may be in a pre-configured state corresponding to snapshots captured during an initialized state for the runtime environment to reduce an amount of time needed to initiate executing the image, while providing the contained runtime environment may permit substantially simultaneous and independent execution for various different images corresponding to various different appliances.

According to one aspect of the invention, a "snapshot" of the image being executed in the hosted runtime environment may be captured at any point during the execution. The snapshot may generally capture an entire state of the image at any particular point, wherein the snapshot may then be used in various ways to manage the appliance. For example, the snapshot may be captured after various tasks have been performed, such that a state of the image can be captured at any particular time to enable restoring the appliance to a runtime state corresponding to the snapshot. In another example, the snapshot may be captured when the appliance is in a crashed state to simplify debugging or support processes for the appliance. Furthermore, various snapshots for the image may be captured at different points in time, wherein any changes or other differences between different snapshots may be attributed to runtime activity that occurred in a period of time between when the snapshots were captured. In this manner, different snapshots taken at different points in time may be compared to one another to provide feedback for auditing one or more specific activities.

According to one aspect of the invention, the hosted runtime environment may be further configured to generate one or more runtime logs. For example, the hosted runtime environment may include a monitoring engine, which may be used to generate runtime logs identifying files that were modified, unused, and/or underused during execution of the appliance image. In particular, in one implementation, the runtime logs may include any files that were modified subsequent to the image being loaded in the runtime environment, and may further include information specifically describing the manner in which such files were modified. Furthermore, the runtime logs may include any files that were unused or underused subsequent to the image being loaded in the runtime environment, and may further include information specifically describing the manner in which such files were unused or underused. As such, the user may interact with the runtime logs and determine whether or not to modify the appliance. For example, building a modified version of the appliance may result in an image encapsulating one or more of the snapshots captured for the appliance. In addition, the user may individually select one or more changes in the runtime logs to apply in the modified version of the appliance.

According to one aspect of the invention, the virtualization environment may further enable appliances to be deployed to one or more runtime environments. For example, a user may download one or more images to a client device for execution in an appropriate runtime environment at the client device. In addition, one or more images may be deployed to a web server, a cloud or virtualized computing environment (e.g., the Amazon Elastic Compute Cloud), or any other environment suitable for hosting or otherwise executing the appliance. Alternatively (or additionally), the user may execute an appliance in the hosted runtime environment, in which case the hosted runtime environment may be launched and managed in a similar manner as discussed above.

Other objects and advantages of the invention will be apparent to those skilled in the art based on the following drawings and detailed description.

DETAILED DESCRIPTION

Figure 1:
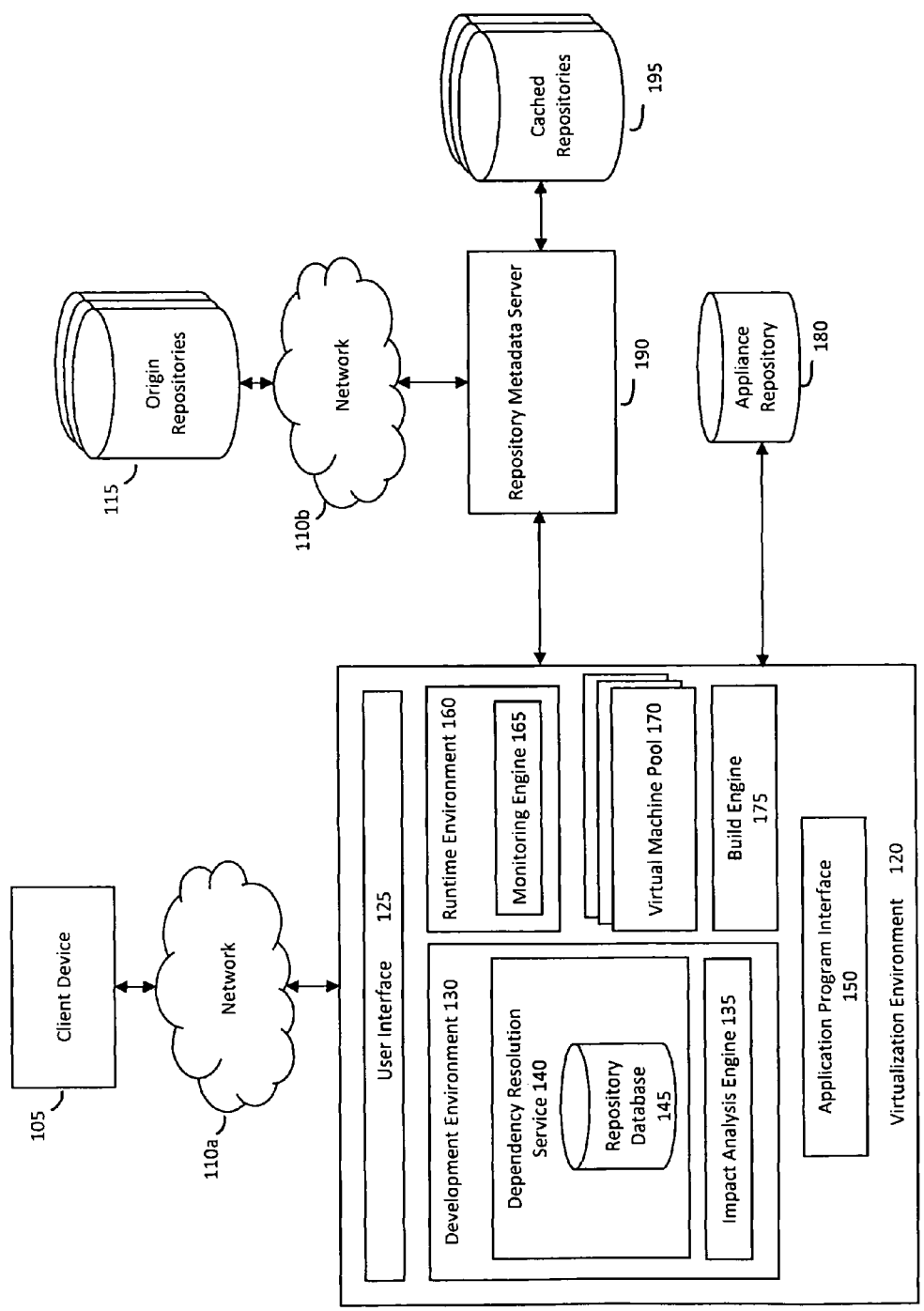
FIG. 1 illustrates a block diagram of an exemplary system for managing a virtual appliance lifecycle, according to one aspect of the invention.

According to one aspect of the invention, FIG. 1 illustrates an exemplary system for managing a virtual appliance lifecycle. In particular, the system illustrated in FIG. 1 may include a virtualization environment 120, which provides a unified framework for developing, building, testing, deploying, and otherwise managing a lifecycle for virtual appliances. Integrating the functions of developing, building, testing, deploying, and otherwise managing the lifecycle of virtual appliances within the unified virtualization environment 120 may provide various synergies, including the ability to enable users to easily follow a repeatable process to create, build, and configure a virtual appliance distribution, monitor upstream changes and modifications to virtual appliances in a collaborative and user-driven manner, and provide real-time analysis and feedback during various phases of the virtual appliance lifecycle. In one implementation, for example, the virtualization environment 120 may be used to create tuned virtual appliances that contain one or more applications and "just enough operating system" (JeOS) components to run the one or more applications, create live portable media (e.g., a CD, DVD, USB key, etc.) that contain particular packages or software, and/or build hard disk images to be preloaded directly onto hardware, among various other tasks relating to management of a virtual appliance lifecycle, as described in further detail below.

In one implementation, the virtualization environment 120 illustrated in FIG. 1 may be provided as a hosted service, wherein a local or remote client device 105 may access the virtualization environment 120 over a network 110a to develop one or more virtual appliances. The client device 105 may then access a development environment 130 associated with the hosted virtualization environment 120, wherein the development environment 130 may be configured to operate in a create mode that enables a user of the client device 105 to develop one or more virtual appliances. In particular, when the user initiates the create mode, the development environment 130 may be configured to launch a development interface within a user interface 125, wherein the development interface may provide various options for the user to develop one or more virtual appliances.

For example, in one implementation, the development interface may provide the user with an option to create a virtual appliance from one or more "just enough operating system" (JeOS) templates, which may be stored in an appliance repository 180 coupled to the virtualization environment. In particular, each of the JeOS templates may generally include only the core components, packages, patterns, or other information needed to create a virtual appliance having a minimal operating system footprint. In one implementation, in response to the user selecting the option to create an appliance from the JeOS templates, the JeOS templates available in the appliance repository 180 may be presented to the user for selection within the user interface 125. For example, the user may select a text only JeOS template to create an appliance having nothing more than a general purpose Linux operating system (i.e., with no graphical interface). Alternatively (or additionally), the user may select a JeOS template that includes a general purpose operating system and one or more additional components (e.g., one or more of the JeOS templates may provide a minimal graphical interface, a GNOME or KDE desktop environment, a virtual server package, or other components in addition to the general purpose Linux operating system). As such, in response to the user selecting one of the JeOS templates, the development environment 130 may create a new base appliance including only the components that correspond to the selected template, and the new base appliance may then be loaded for further development within the user interface 125.

In one implementation, the development interface may further provide the user with an option to clone an appliance that the user and/or other users have previously developed in the virtualization environment 120. For example, in one implementation, the appliance repository 180 may store one or more appliances that the user previously developed in the virtualization environment 120, in addition to various appliances that users of the virtualization environment 120 have published for public access. As such, the development environment 130 may provide the user with an option to browse and/or search an appliance marketplace, which may include the user's previously developed appliances and the published appliances stored in the appliance repository 180.

For example, in one implementation, the appliance repository 180 may include a descriptive information for each of the appliances available in the appliance marketplace, including appliance names, developer names or aliases, descriptions of software or other components in the appliances, release information (e.g., version numbers, numbers of releases, release dates, release types, release sizes, etc.), popularity (e.g., numbers of positive and/or negative user votes, numbers of user downloads, user comments, etc.), or other information describing the various appliances in the marketplace. Thus, the user may browse the appliance marketplace to select an appliance from the appliance repository 180 or search the appliance marketplace to identify appliances having certain characteristics or matching certain criteria. For example, the user may search the appliance marketplace according to appliance name, software, release information (e.g., age, release type, version number, etc.), size (e.g., a number of megabytes or gigabytes), and/or popularity (e.g., voting statistics, download statistics, etc.). In another example, the user may create a profile describing a particular hardware configuration and then search for appliances in the marketplace that are compatible with that hardware configuration, popular among other users having similar hardware configurations, or otherwise relevant to the information in the profile.

In one implementation, in response to the user selecting one of the appliances in the marketplace after browsing and/or searching the appliance marketplace, the development environment 130 may clone the selected appliance to create the base appliance that can be further developed within the user interface 125. Alternatively (or additionally), the user may download the appliances in the marketplace to the client device 105, provide positive or negative votes for the appliances in the marketplace, and/or post comments in a user-driven discussion for the appliances in the appliance marketplace. As such, in addition to providing the user with access to other appliances that have been developed in the virtualization environment 120, the appliance marketplace may provide a community in which users can collaborate and otherwise interact to manage the lifecycle of a virtual appliance.

In one implementation, the development interface may further provide the user with an option to import a predefined configuration file, wherein the development environment 130 may be configured to create the base appliance from the imported configuration file. For example, in one implementation, the development environment 130 may be capable of importing and parsing configuration files associated with any suitable image creation system, wherein the configuration files generally include an image description for an appliance (i.e., name, author, contact information, description, and version), a definition of users, groups, or other identity management settings for the appliance, a definition of repositories and packages included in the appliance, and a directory structure for the appliance image. Thus, in response to the user importing a configuration file, the development environment 130 may parse the configuration file, create the base appliance from the configuration file, and then load the base appliance for further development within the user interface 125. For example, in one implementation, the development environment 130 may be configured to import configuration files defined in accordance with an image creation system, such as the openSUSE Kiwi Image System, as described in "openSUSE-KIWI Image System Cookbook" by Marcus Schaefer, the contents of which is hereby incorporated by reference in its entirety.

In one implementation, upon loading the newly created base appliance for further development within the user interface 125, an appliance overview describing the appliance may be displayed, wherein the user can edit one or more aspects of the description. For example, if the user created the new appliance from the text only JeOS template described above, the description of the appliance may include a name (e.g., "My Custom Appliance"), a brief narrative description (e.g., "A basic openSUSE 10.3 system, with no graphical interface"), a base distribution (e.g., openSUSE 10.3), an architecture (e.g., x86 and x86_64), an origin (e.g., openSUSE 10.3 and the text only JeOS template), and various statistics (e.g., a number and type for various stored builds of the appliance, descriptions for any of the stored builds that have been published in the marketplace, etc.). Thus, the manner in which the appliance was created and/or cloned may be used to populate the descriptive information such as base distribution, architecture, and origin, while the user may edit the appliance name, the narrative description, or any other information that does not directly result from the manner in which the appliance was created and/or cloned.

In one implementation, once the appliance has been loaded for further development and the user has completed the appliance overview, the create mode may enable the user to select various packages, patterns, files, or other software components to be included in the appliance. For example, packages may generally include distributions of related software components and descriptive metadata such as a full name, version number, vendor, and dependencies for the software, and patterns may generally include reusable descriptions or templates for solutions that address recurring software design problems. Thus, in one implementation, a repository metadata server 190 may be configured to cache information associated with one or more origin repositories 115 that include packages, patterns, or other software that can be added to appliances developed in the virtualization environment. Further detail describing the repository metadata server 190 is included in U.S. patent application Ser. No. 12/369,188, entitled "System and Method for Building Virtual Appliances Using a Repository Metadata Server and a Dependency Resolution Service," filed Feb. 11, 2009, the disclosure of which is hereby incorporated by reference in its entirety.

In particular, the repository metadata server 190 may be configured to contact one or more of the origin repositories 115 over a network 110*b*. The repository metadata server 190 may then cache information contained in the origin repositories 115, wherein the cached information may include the packages, patterns, or other software contained in the origin repositories 115, metadata describing the origin repositories 115, and metadata describing the packages, patterns, or other software contained in the origin repositories 115. As such, the user may interact with the repository metadata server 190 to add, remove, update, or otherwise query information associated with one or more of the origin repositories 115. For example, the repository metadata server 190 may communicate with the client device 105 and/or the origin repositories 115 using function calls associated with XML-RPC, SOAP, local UNIX pipes, a custom communication implementation, or other communication mechanisms to enable the user to select packages, patterns, or other software components contained in the origin repositories 115.

For example, in one implementation, the create mode may provide the user with an option to add a new origin repository 115, wherein the user may define a name for the new origin repository 115 and further provide a location where information for the new origin repository 115 can be obtained. The repository metadata server 170 may then contact the new origin repository 115 using the location provided by the user and retrieve metadata describing the new origin repository 115 and any packages and patterns contained therein. In one implementation, the metadata retrieved from the origin repositories 115 may be used to build resolution data files that can be provided to a dependency resolution service 140. For example, as described in further detail in U.S. patent application Ser. No. 12/369,188, which was incorporated by reference above, the repository metadata server 190 may include an active daemon list identifying one or more active resolution daemons associated with the dependency resolution service 140. Thus, the repository metadata server 190 may build the resolution data files, which generally include one or more resolution graphs, and the resolution data files may be pushed to the active resolution daemons in the active daemon list.

In one implementation, the repository metadata server 190 may further insert the metadata describing the new origin repository 115 and the packages and patterns contained therein into a repository database 145 coupled to the dependency resolution service 140. As such, the development environment 130 may reference information relating to the origin repository 115 through the repository database 145, such that the user can access the origin repository 115 and the packages, patterns, or other software contained therein through the development environment 130. Additionally, the repository metadata server 190 may download the packages, patterns, or other software from the origin repository 115 and then store the download packages, patterns, or other software in one or more cached repositories 195, thereby creating a cached version of the origin repository 115 stored locally with respect to the virtualization environment 120.

In one implementation, the create mode may further provide the user with an option to select one or more of the origin repositories 115 available through the repository metadata server 190. The selected repositories 115 may then provide a source of software that can be included in the appliance. For example, the user may query the repository database 145 to view information relating to the origin repositories 115 available through the repository metadata server 190 (including any repositories 115 that may have been added by the user), or the user may search the repository database 145 to identify one or more of the origin repositories 115 having a particular name, a particular type, or particular software (e.g., the user may enter a search string of "Apache" to search the repository database 145 for origin repositories 115 that contain one or more Apache packages). Furthermore, in response to determining that a plurality of the origin repositories 115 contain software matching the search criteria provided by the user, the plurality of origin repositories 115 may be ranked in various ways (e.g., based on a number of packages matching the search within each of the various origin repositories 115, popularity of the various origin repositories 115, etc.). In response to the user selecting one or more of the origin repositories 115 to be a source of software for the virtual appliance, the repository metadata server 190 may then enable the user to access the packages and patterns contained in the selected origin repositories 115 (e.g., by downloading the packages and patterns to the cached repositories 195, and enabling the user to retrieve the downloaded packages and patterns from the cached repositories 195).

In one implementation, to provide reliable responses to user queries, the repository metadata server 190 may be configured to ensure that the cached repositories 195 maintain an updated cache of the origin repositories 115. For example, if a user requests information relating to a particular one of the origin repositories 115, the repository metadata server 190 may compare a local digest for the origin repository 115 to a current digest for the origin repository 115 (e.g., the digest may represent a metadata signature for the origin repository 115, wherein any changes to the origin repository 115 may result in a change to the digest or metadata signature for the origin repository 115). Alternatively (or additionally), the repository metadata server 190 may compare the local digests for one or more of the origin repositories 115 to current digests for the origin repositories 115 according to a schedule, which may be predetermined, user-defined, or configured in various other ways. As such, if the local digest for the origin repository 115 matches the current digest for the origin repository 115, the repository metadata server 190 may determine that the cached repositories 195 are current for the origin repository 115. However, if the local digest and the current digest do not match, the repository metadata server 190 may follow the procedures described above for adding a new origin repository 115 to update the outdated cache of the origin repository 115.

In one implementation, the user may interact with the repository metadata server 190 in various ways to manage software for a virtual appliance. For example, the repository metadata server 190 may be queried to obtain a real-time status of the origin repositories 115, including whether a particular origin repository 115 is currently being added, updated, or deleted. The user may also browse the origin repositories 115 in various ways to select software to be included in the virtual appliance. For example, software in the origin repositories 115 may be organized into various software groups, wherein the user may browse the groups to select packages, patterns, or other software components that provide specific functionality (e.g., the groups may organize software based on functionality relating to operating systems, development, games, graphics, multimedia, office suites, systems, servers, networking, desktop environments, etc.). In one implementation, the user may further interact with the repository metadata server 190 to search the origin repositories 115 for packages, patterns, or other software components that match certain criteria provided by the user.

As such, the repository database 145 may enable the user to browse and/or search the software contained in the origin repositories 115 in order to manage software for a virtual appliance (e.g., the user may select packages, patterns, or other software to be included in the appliance, and may further ban packages, patterns, or other software from the appliance). For example, in addition to populating the repository database using the metadata associated with the packages, patterns, or other software downloaded from the origin repositories, the repository metadata server may further scan the downloaded software to discover additional information describing the software. As such, the repository database 145 may further respond to queries from the user relating to the information discovered within the downloaded software (e.g., the metadata may indicate that a particular package has components for configuring users for a particular system, such as an Apache or PostgreSQL service). In one implementation, software within the repository database 145 may be filtered according to one or more active origin repositories 115 selected by the user, subsets or groups of the active origin repositories 115, and/or all of the origin repositories 115 known to the repository metadata server 190. Additionally, information relating to the origin repositories 115 selected by the user may be merged with the appliance to provide dynamic control over updating the appliance (e.g., the appliance may be automatically updated in response to an update to an active origin repository 115 or an update to a relevant package contained in the active origin repository 115, or a message may be sent to the user that such an update is available, etc.).

In one implementation, to assist the user in making selections relating to the packages, patterns, or other software available in the origin repositories 115, the software may be associated with one or more metrics based on activity in the virtualization environment 120. For example, a user may search the repository database 145 for a particular package, and packages matching the search may be ranked based on a popularity metric for the matching packages. In one implementation, the popularity metric may be derived from how popular a particular package or origin repository 115 is among various users of the virtualization environment 120, thereby providing information to distinguish different packages or versions of a package based on selections made by other users. For example, the popularity metric may be provided as a numeric integer such as a ranking from one to ten, a visual object such as a series of vertical lines (e.g., with the number of vertical lines increasing as a function of popularity), or in various other ways.

In one implementation, the metrics may further include a trust metric for one or more of the origin repositories 115 and/or software contained therein, wherein the trust metric may provide the user with information identifying trusted software or origin repositories 115. In particular, the repository metadata server 190 may provide an interface for an administrator or another authorized user to manage cryptographic keys (e.g., PGP certificates) that are used to determine whether a particular package or origin repository 115 is "trusted" or "untrusted." For example, if the repository metadata server 190 downloads a package signed with a cryptographic key from a particular origin repository 115, the cryptographic key may be validated to determine the trust metric for the particular package or origin repository 115 (e.g., if the cryptographic key indicates that the package originates from a trusted partner or other entity known to a provider of the virtualization environment 120, the package or repository 115 may be marked "trusted," whereas if the cryptographic key indicates that the package originates from an unknown source, which may or may not be malicious, the package or repository 115 may be marked "untrusted").

In one implementation, the user interface 125 for searching the origin repositories 115 may include an automatic complete feature to identify potentially relevant search results. For example, when the user begins typing a search string within the search user interface 125, the metadata stored in the repository database 145 may be queried in real-time to identify the potentially relevant results, prior to the user completing and submitting the search string. As such, the potentially relevant results may then be used to automatically complete the search string. For instance, if the user wants to add an IMAP server package to the appliance but does not know the correct name of the package, the user may begin typing "IMAP . . . " within the search user interface 125. The repository metadata database 145 may then be searched to determine one or more search strings that begin with or otherwise contain "IMAP." The search strings may then be displayed to recommend one or more completion terms (or combinations of completion terms), wherein the user can select one of the recommended completion terms (or combinations of completion terms) to automatically complete the search string that the user is currently typing. As such, the automatic complete feature may provide a mechanism to search for software in a manner that tolerates minor misspellings, variations in terminology, and/or incomplete information, while also employing search engine capabilities to recommend one or more terms to complete the search string being provided by the user.

In one implementation, the user interface 125 for interacting with the software in the origin repositories 115 may be configured to provide information describing the software in response to one or more interactions with the client device 105. For example, the user at the client device 105 may hold a mouse pointer or other input mechanism over a certain package or software component, and a pop-up window may be displayed in the user interface 125 in response to the interaction. In one implementation, the pop-up window may include information such as an origin repository 115, a version number, one or more groups (e.g., productivity, networking, browsers, etc.), a size or other data quantity, software licenses and permissions, or other information describing the package or software component. Alternatively (or additionally), the user may click or otherwise select the package or software component to view a more detailed description of the package or software component.

In one implementation, in response to the user selecting one or more packages, patterns, or other components for the appliance, the selected components may be retrieved from the cached repositories 195 and added to the appliance. In one implementation, if the repository metadata server 190 has not yet downloaded the selected components to the cached repositories 195, the selected components may be downloaded to the cached repositories 195 and then added to the appliance. Further, the repository metadata server 190 may dynamically reorder a download queue to prioritize the selected components. Additionally, the user may query the repository metadata server 190 to obtain a current status of any pending downloads (e.g., the current status may identify a package or other component currently being downloaded, a number of packages or other components remaining to be downloaded, or other information relating to the status of software being downloaded from the origin repositories 115 to the cached repositories 195).

In one implementation, in response to the user selecting and/or banning software for the appliance, the dependency resolution service 140 may scan the resolution graphs provided by the repository metadata server 190 to analyze various dependencies for the selected and/or banned software. For example, any particular package may include metadata describing, among other things, other packages that are required for the package to operate properly, other packages that are recommended (but not required) for the package to operate optimally, other packages that are suggested (but not required) to enhance the package's functionality, and other packages that conflict (and cannot be installed) with the package. As such, if the user selects a particular package to be included in the appliance, the dependency resolution service 140 may scan the metadata associated with the selected package to obtain a complete manifest of dependent packages. The user may then be notified in response to other packages being required for the selected package, other packages already selected for the appliance conflicting with the selected package, or other relevant dependencies being identified.

In one implementation, the repository metadata server 190 may and the dependency resolution service 140 may interact with one another to manage software for appliances created in the development environment 130. For example, the repository metadata server 190 may register one or more active resolution daemons associated with the dependency resolution service 140 and store information relating to the registered resolution daemons in an active daemon list. As such, when the repository metadata server 190 adds, updates, or deletes information associated with one or more of the origin repositories 115, the repository metadata server 190 may push the current information associated with the origin repositories 195 to the dependency resolution service 140, thereby ensuring that the repository database 145 contains current information for the origin repositories 115. In addition, the repository metadata server 190 may use metadata retrieved from the origin repositories 115 to create one or more resolution graphs defining dependencies for the packages contained in the origin repositories 115. The repository metadata server 190 may then push the resolution graphs to the registered resolution daemons to be used when resolving dependencies for software that the user has selected and/or banned from the appliance.

In one implementation, in response to the user selecting and/or banning one or more packages, patterns, or other software components for the appliance, the dependency resolution service 140 may invoke one or more of the resolution daemons to identify software that is dependent, recommended, suggested, and/or conflicting for the selected and/or banned software. For example, to resolve dependencies for a particular package, the active resolution daemons may scan the resolution graphs for annotations or metadata explicitly describing dependencies for the package. In addition, the active resolution daemons may further scan pre-installation and post-installation scripts for the package to determine configurations for the scripts (e.g., a script may be configured to execute a command relating to a dependent package, and may further scan content associated with the package to introspectively identify dependencies (e.g., based on documentation included in the package).

Thus, when a user adds a particular package to the appliance, the dependency resolution service 140 may identify any other packages or components that the package may require, wherein the required packages or components may be added to the appliance automatically (e.g., in response to the user adding a server package, one or more packages needed to authenticate users, manage a file system, or perform other tasks to properly operate the server may be added to the appliance automatically). Further, the dependency resolution service 140 may identify any packages already added to the appliance that conflict with the added package, wherein the conflicting packages may be removed from the appliance to resolve the conflict. In one implementation, if the added package has recommended and/or suggested dependencies, such dependencies may be presented to the user through the user interface 125, and the user may determine whether or not to include the recommended and/or suggested packages. Alternatively (or additionally), the development environment 130 may be configured to automatically add the recommended and/or suggested packages and enable the user to determine whether or not to remove the recommended and/or suggested packages that were automatically added.

In one implementation, the development environment 130 may further include an impact analysis engine 135, which may analyze any changes to the appliance caused by adding and/or removing software in relation to the appliance, and may further analyze any changes resulting from the resolution of dependencies for the added and/or removed software. The impact analysis engine 135 may then populate the user interface 125 with information describing the impact of the changes, providing the user with immediate feedback describing the further development of the appliance. For example, in one implementation, the impact analysis engine 135 may display a list of packages added to or deleted from the appliance (including packages added or deleted in response to the dependency resolution), an amount of data associated with the software, a number of pending downloads relating to the software, open source licenses and associated permissions for the software, or any other suitable information relevant to the changes to the appliance.

Additionally, in one implementation, the impact analysis engine 135 may analyze the changes to the appliance to identify potential error conditions and provide the user with recommended options to correct the error conditions. Thus, in response to a particular change to an appliance causing an error, inconsistency, or other issue that cannot be fixed automatically, the impact analysis engine 135 may display a warning within the user interface 125 and may provide a recommendation for the user to manually correct the issue. For example, if the user adds a package that declares an open source license in conflict with a license declared in another package that has already been added to the appliance, the impact analysis engine 135 may recommend one or more options to resolve the conflict between the licenses.

In one implementation, the dependency resolution service 140 may be further configured to provide the user one or more options to customize various aspects of the appliance. For example, user interfaces, menus, and other components of the appliance may be customized around installed and dependent packages (e.g., in response to the user selecting a user interface or desktop environment package, "just enough UI" may be installed to support user interface elements for installed and dependent packages). In addition, the user may be provided with an undo option to modify the automatic addition or banning of packages (e.g., the user may remove dependent packages that were automatically added, override banned packages to permit their installation, etc.). Further, when the user removes a package or other component from the appliance, the dependency resolution service 140 may identify any packages that were only installed as a dependency of the removed package. Thus, the dependency resolution service 140 may attempt to automatically remove unnecessary software in order to maintain a footprint for the appliance that is as small as possible.

In one implementation, upon the user having selected the packages, patterns, or other software components to be included in the appliance, the user may configure a build for the appliance. In particular, the user may select a configuration option associated with the development environment 130 (e.g., a tab, button, or other option displayed within the user interface 125), which may result in the development environment 130 loading a configuration interface within the user interface 125. In one implementation, the configuration interface may provide one or more options for establishing settings for a locale (e.g., language, keyboard layout, region, time zone, etc.), a network (e.g., whether to configure the network during a first boot, discover settings for the network automatically using DHCP, manually configure the network, enable a firewall for the network, etc.), identity management (e.g., definitions of users, passwords, login preferences, access controls, etc.), run level (e.g., single user, multi-user with no network, normal console, graphical login, etc.), program settings (e.g., applications to start on boot or login, printer daemons or other system services to be enabled, etc.), storage and memory (e.g., a default size for a hard disk, memory, etc.), and/or various other settings. As such, the configuration interface may provide the user with various options to configure the build for the appliance, such that a resulting image of the appliance may be configured to operate in accordance with the customized settings provided by the user.

In one implementation, the configuration interface may further interact with one or more other components described herein to assist the user in managing certain configuration options. In particular, in one implementation, the options provided to the user in the configuration interface may be customized based on metadata or other information that the repository metadata server 190 and/or the dependency resolution service 140 discover for the packages or other software included in the appliance. For example, in response to a package for a Postgres or a MySQL database being added to the appliance, the user may be provided with one or more options to configure specific services associated with the Postgres or MySQL database package (e.g., a web server appliance may typically include one or more databases, which may be configured with tables that are pre-loaded using data identified in a database schema dump file, with identity management settings or permissions for different users, etc.).

Furthermore, in one implementation, the impact analysis engine 135 may be configured to analyze the configuration settings established by the user, such that the impact analysis engine 135 may determine whether the configuration settings result in (or should result in) one or more changes to the appliance. For example, in response to the user specifying that the network is to be configured during a first boot, the dependency resolution service 140 may determine that the "yast2-firstboot" package must be installed in order for the network to be configured during the first boot (i.e., the "yast2-firstboot" package may include a first boot utility that runs after installation completes in order to guide the user through various steps for configuring a machine). As such, the impact analysis engine 135 would display a notification for the "yast2-firstboot" dependency in the user interface 125 and provide a recommendation for resolving the dependency (e.g., displaying an option to add the yast2-firstboot package).

In one implementation, after the user has configured the appliance and any software added to the appliance that has configurable options, the user may personalize the build for the appliance. In particular, the user may select one or more personalization options associated with the development environment 130 to load a custom files interface within the user interface 125. In one implementation, the custom files interface may provide one or more options for the user to add one or more custom files or archives to the appliance (e.g., the archives may be in a format such .tar gz, tar bz2, .tgz, .tbz, .zip, etc.). As such, the custom files or archives may be added to the appliance in addition to any files, packages, or other software that may have been added through the repository metadata server 190. For example, the user may upload the custom files or archives from the client device 105, or the user may identify a location (e.g., a URL) where the custom files or archives are located. In addition, the user may optionally specify a target path or directory for the custom files or archives, as well as identity management settings (e.g., owning users or groups, permissions, etc.). As such, if the user adds one or more custom files or archives to the appliance, the custom files or archives may be copied to the appliance within the specified target directory after all other software selected for the appliance has been installed.

Additionally, in one implementation, one or more of the personalization options may cause the development environment 130 to load a personalization interface within the user interface 125, wherein the personalization interface may include one or more options for the user to personalize the build for the appliance. For example, the personalization interface may include options for establishing a graphic to be used as a logo or icon for the appliance, a background graphic for screens associated with a boot selection, boot, login, console, desktop, or other screen displayed when the appliance executes. In one implementation, the user may select one or more of the logo, background, or other graphics from an inventory provided in the personalization interface, or the user may upload graphics to personalize the visual features of the appliance, wherein the graphics uploaded by the user may optionally be added to the graphics inventory and made available to other users of the virtualization environment 120.

As such, in one implementation, the personalization interface may be used to extend branding functionality to various user interfaces in the appliance that include logos or graphics. For example, the packages, patterns, or other software added to the appliance may be analyzed to identify where graphics are located or otherwise referenced, and a template may then be applied to the identified graphics to enable the graphics to be replaced, deleted, or otherwise modified. For example, the user may apply custom logos or graphics to replace one or more of the graphics and essentially "re-brand" the appliance, or the user may conversely remove one or more of the identified graphics (e.g., because the user lacks a license or other authorization to use an embedded trademark, in which case removal of the graphic trademark may be required). Furthermore, in cases where the user applies one or more logos or graphics to create a re-branded appliance, the applied logos or graphics may be used in distributable media for the re-branded appliance.

Furthermore, in one implementation, the virtualization environment 120 may provide one or more application program interfaces 150 to enable users, third-party developers, or various other entities to develop custom plug-ins or applications that can be used in the virtualization environment 120. The custom plug-ins or applications may be developed using any suitable programming language capable of communicating with the virtualization environment 120 through the application program interface 150. For example, custom plug-ins or applications may be designed to configure appliances or specific types of software (e.g., to edit or configure specific functionality, such as for Apache packages), to customize appliance creation processes (e.g., to provide social networking features, such as managing the appliance marketplace), or to otherwise modify any suitable functionality that may be provided in the virtualization environment 120. Thus, the one or more application program interfaces 150 may provide a development platform for integrating third-party software, as described in further detail in U.S. patent application Ser. No. 12/476,144, entitled "System and Method for Managing a Virtual Appliance Lifecycle," filed on an even date herewith, the disclosure of which is hereby incorporated by reference in its entirety. As a result, various features and functions associated with the virtualization environment 120 may be extended through the one or more application program interfaces 150, thereby leveraging collective knowledge that may be held within a development community, whereby the lifecycle of virtual appliances can be managed within the virtualization environment 120 in a customized and personalized manner.

In one implementation, the virtualization environment 120 may further include a build engine 175, which may be configured to build an image of the appliance that the user created, configured, personalized, and/or otherwise developed within the development environment 130. In particular, the development environment 130 may create an image description for the appliance, wherein the image description may generally include the packages, patterns, or other software components to be included in the appliance and the origin repositories 115 containing the selected software components. In addition, the image description may optionally further include any configuration and/or personalization options that the user may have provided for the software and/or the appliance. The development environment 130 may then provide the image description for the appliance to the build engine 175, whereby the build engine 175 may use the image description to build the image for the appliance.

In one implementation, the build engine 175 may be invoked in response to the user selecting an option to build a bootable image of the appliance, wherein the build engine 175 may then display one or more options within the user interface 125 to enable the user to configure the build of the image. For example, the build options may include an option to specify a name for the image, which may be displayed on a boot screen for the appliance, a version number for the image, and an origin for the appliance (e.g., a base appliance cloned and derived to create the appliance). In addition, the build options may include an option to specify a format for the image, wherein the image may be formatted as an HDD/USB disk image, an .iso live CD/DVD image, a .vmdk VMware virtual machine image, and/or an .img Xen virtual machine image, among other image formats. The user may then select an option to initiate building the bootable image of the appliance.

For example, in one implementation, the build engine 175 may launch one or more virtual machines from a virtual machine pool 170 in response to the user selecting the option to initiate building the bootable image of the appliance. In particular, the launched virtual machine may provide a contained virtual environment for building the image, such that the build engine 175 can simultaneously and independently build images for more than one appliance at a particular time (i.e., the build process may operate at a root user level, whereby building images within contained virtualized environments may permit multiple images to built simultaneously using resources that are shared across the virtualization environment 120). Thus, various different users of the virtualization environment 120 may initiate one or more builds at any particular time, wherein the contained build environment may preserve shared resources of the hosted virtualization environment 120 that may needed for users at various different client devices 105.

In one implementation, the build engine 175 may be further configured to provide information relating to a current status for the build throughout the build process. For example, the build engine 175 may communicate the current status to the user through the user interface 125, wherein the current status may include an elapsed time for the build, a progress meter visually indicating a degree to which the image has been built or remains to be built, and a current status of the build process (e.g., "Setting up build environment," "Preparing system image," "Creating boot ramdisk," etc.). In one implementation, the build engine 175 may further provide links to one or more logs associated with the build process, including a build log providing information relating to processes that occur during the entire build, a Kiwi log providing information relating to creation of a system image, or various other logs. As such, the one or more logs associated with the build process may provide the user with a mechanism to debug or otherwise manage the build process (e.g., if an error should occur during the process of building the appliance image). Furthermore, in one implementation, the build engine 175 may provide limited access to one or more debugging files (e.g., for administrators or other authorized users), wherein the debugging files may include a config.xml file, an extra_config.xml file, and an ensconce_manifest.txt file, among other debugging files.

In one implementation, the build engine 175 may then store the completed build of the appliance image in the appliance repository 180, and the user may be provided with one or more options to interact with the appliance image. For example, names, version numbers, image formats, compressed and uncompressed sizes, build dates, or other information relating to the user's appliance images may be displayed within the user interface 125. As such, the user may delete one or more of the images from the appliance repository 180, publish one or more of the images to the appliance marketplace, and/or deploy one or more of the images for execution in one or more runtime environments.

For example, in one implementation, the user may select one or more of the appliance images for download to the client device 105, wherein the user may then execute the appliance in an appropriate runtime environment at the client device 105. In addition, the user may deploy one or more of the appliance images to a web server, a cloud or virtualized computing environment (e.g., the Amazon Elastic Compute Cloud), or any other environment suitable for hosting or otherwise executing the appliance. Alternatively (or additionally), the user may execute one or more of the appliances in a runtime environment 160 hosted at the virtualization environment 120. For example, in response to the user selecting an option to execute the appliance in the hosted runtime environment 160, a virtual machine may be launched from the virtual machine pool 170 to create a contained runtime environment 160 for executing the appliance. As such, the user may execute the appliance within the contained runtime environment 160 in a manner that preserves resources that are shared across the virtualization environment 120. In addition, the hosted runtime environment 160 may include a monitoring engine 165 having one or more appliance management utilities (e.g., the appliance may be executed in the hosted runtime environment 160 to determine whether the appliance functions properly or was correctly built, to identify un-utilized or under-utilized files that can be removed from the appliance, to characterize certain processes that occur during execution of the appliance, etc.).

Figure 2:
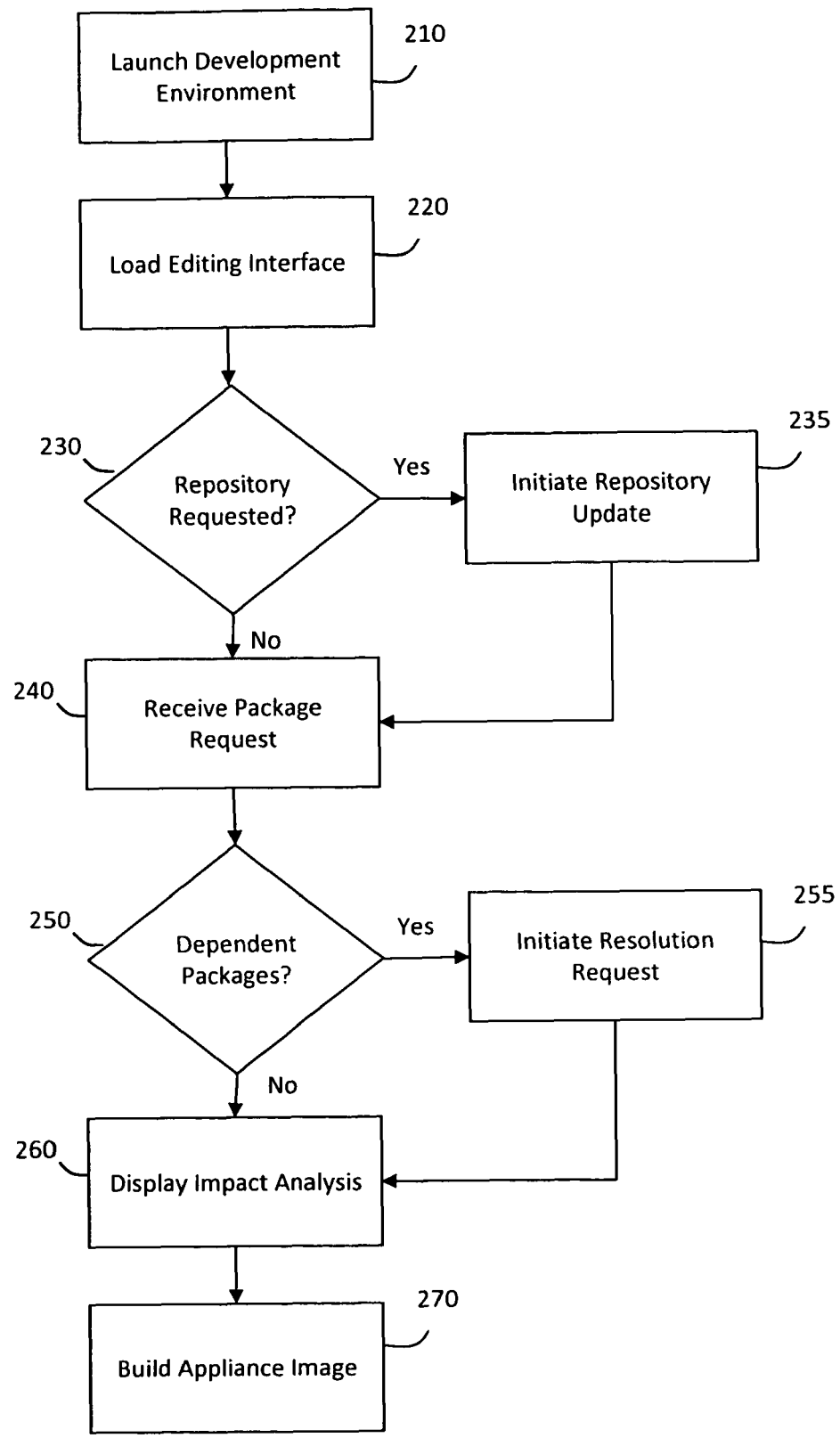
FIG. 2 illustrates a flow diagram of an exemplary method for creating virtual appliances, according to one aspect of the invention.

According to one aspect of the invention, FIG. 2 illustrates a flow diagram of an exemplary method for creating virtual appliances in a system for managing a virtual appliance lifecycle. In particular, the method illustrated in FIG. 2 may begin in an operation 210, wherein a user at a remote client device establishes a connection to a system for managing a virtual appliance lifecycle (e.g., the system illustrated in FIG. 1 and described in further detail above). The user may then include launch a development environment associated with the virtual appliance management system in order to create one or more virtual appliances. In one implementation, upon launching the development environment, operation 210 may further include receiving information from the user that identifies a base appliance to be created in the development environment.

For example, in one implementation, the information received from the user in operation 210 may include a selection of a predefined JeOS template (e.g., a template for a virtual appliance having a minimal operating system footprint). Alternatively, the information received from the user may include a request to clone an appliance that the user previously developed in the development environment, a request to clone an appliance from an appliance marketplace (e.g., appliances that other users have previously developed and published to the appliance marketplace), or an imported configuration file that includes an image description for an appliance (e.g., directory structures, configuration scripts, packages, software, or other information describing an appliance image). In one implementation, in response to receiving the information identifying the base appliance in operation 210, the base appliance in may be created and loaded within an editing interface in an operation 220. As such, the user may then interact with various features provided in the editing interface to further develop the base appliance within the development environment.

In one implementation, once the base appliance has been loaded for editing within the editing interface in operation 220, the user may access a repository metadata server to add, remove, update, or otherwise query information associated with one or more origin repositories that include packages, patterns, or other software that can be added to and/or banned from the base appliance. As such, in one implementation, an operation 230 may include determining whether a request has been received from the user to add, remove, update, or otherwise query information associated with one or more of the origin repositories. In response to operation 230 determining that the user has provided a request relating to one or more of the origin repositories, an update for the origin repositories identified in the request may be initiated in an operation 235.

For example, if the request received from the user identifies a new origin repository to be added to the repository metadata server, operation 235 may include prompting the user to define a name and/or a location for the origin repository (e.g., a URL or other location for contacting the new origin repository). The repository metadata server may then use the location information provided by the user to contact the new origin repository and retrieve metadata describing the new origin repository and any packages, patterns, or other software that may be contained therein. Thus, in one implementation, updating the origin repositories in operation 235 may include inserting the metadata retrieved from the new origin repository into a local repository database coupled to the development environment. As such, the user may then query the local repository database to request information relating to the new origin repository, any packages, patterns, or software contained therein, or any other information that can be derived from the metadata retrieved from the new origin repository (e.g., dependency relationships for the packages, patterns, or other software in the origin repository). In one implementation, the packages, patterns, or other software in the new origin repository may be downloaded to one or more locally stored cached repositories, thereby enabling the user to interact with the packages, patterns, or other software contained in the new origin repository through the development environment.

Furthermore, in one implementation, the request received from the user in operation 230 may include a selection of one or more of the origin repositories available through the repository metadata. For example, the user may query the local repository database to request one or more of the origin repositories available through the repository metadata server (including any repositories that may have been added by the user), or the user may query the repository database to search for one or more of the origin repositories having a particular name, a particular type, or particular software (e.g., the user may enter a search string of "Apache" to search the repository database for origin repositories that contain one or more Apache packages). As such, in response to the user selecting one or more origin repositories in operation 230, the selected origin repositories may be updated in operation 235. For example, the repository metadata server may contact the selected origin repositories to determine whether any the origin repositories are outdated (e.g., an origin repository may be outdated if a digest describing a current state of the origin repository does not match a digest that was previously retrieved from the origin repository). Thus, if one or more of the selected origin repositories are outdated, operation 235 may include updating the repository database with current metadata for the outdated origin repositories, downloading updated packages, patterns, or other software from the outdated origin repositories to the cached repositories, and/or building updated resolution data files for the packages, patterns, or other software contained in the outdated origin repositories.

In one implementation, the origin repositories requested by the user in operation 230 may then be used to provide a source of software for the virtual appliance. As such, an operation 240 may include receiving one or more requests from the user, wherein the requests may identify one or more packages, patterns, files, or other software components to be added to and/or banned from the base appliance previously loaded in operation 220. For example, the user may browse the repository database according to one or more software groups to locate one or more packages, patterns, or other software components having specific functionality (e.g., the software groups may be organized based on functionality relating to operating systems, development, games, graphics, multimedia, office suites, systems, servers, networking, desktop environments, etc.).

In one implementation, the requests may further include criteria for searching the repository database for certain packages, patterns, or other software components that match the search criteria. As such, the request received from the user in operation 240 may identify one or more packages, patterns, or other software to be added to and/or banned from the base virtual appliance. In one implementation, the description provided above in relation to FIG. 1 may provide further detail regarding the manner in which the user can browse and/or search the repository database to manage software for the appliance (e.g., results of the browsing and/or searching may be filter according to the origin repositories requested in operation 230, all origin repositories available through the repository metadata server, popularity, trust, or other metrics, etc.).

In one implementation, in response to the user selecting a particular software component to be added to and/or banned from the appliance in operation 240 (e.g., a package, pattern, etc.), one or more dependencies for the selected component may be resolved in an operation 250. In particular, as described in further detail above, any particular package, pattern, or other software component may be associated with metadata describing dependencies for the particular package, pattern, or other software component. For example, in one implementation, the dependencies may include one or more related components that are required for the selected component to operate properly, related components that are recommended (but not required) for the selected component to operate optimally, related components that are suggested (but not required) to enhance the functionality of the selected component, and/or related components that conflict (and thus cannot be installed) with the selected component. As such, in response to the user selecting a particular package, pattern, or other software for the appliance, the metadata associated with the selected component may be scanned in operation 250 to determine whether or not the selected component has one or more dependencies.

In one implementation, in response to determining that the selected component has one or more dependencies in operation 250, a resolution request may then be initiated in an operation 255. For example, a dependency resolution service (e.g., as described above in relation to FIG. 1) may use the metadata describing the origin repository associated with the selected component, and may further use resolution data constructed by the repository metadata server, in order to resolve the dependencies for the selected component. For example, in one implementation, operation 255 may include the dependency resolution service invoking an active resolution daemon to identify any software components that may be dependent, recommended, suggested, and/or conflicting with respect to the selected component. In particular, the active resolution daemon may scan one or more resolution graphs to identify annotations and/or metadata that explicitly describe dependencies for the component, in addition to any pre-installation scripts, post-installation scripts, and/or content associated with the component to introspectively identify further dependencies (e.g., based on documentation included in the package). Thus, in response to resolving the dependencies for the particular component, operation 255 may include automatically adding any required dependencies to the appliance, and may further include automatically removing any conflicting dependencies from the appliance. Additionally, in one implementation, any recommended and/or suggested dependencies may be automatically added in operation 255, or the user may optionally be notified of such dependencies to provide the user with control over whether or not to include the recommended and/or suggested dependencies.

In one implementation, once the user has selected one or more software components to be added to and/or banned from the appliance and any dependencies for the particular components have been resolved, an impact analysis may be performed in an operation 260 to identify any resulting changes to the appliance. For example, operation 260 may include generating a visual notification informing the user of the impact (e.g., displaying a list of packages added to or deleted from the appliance, a data impact on the appliance in terms of megabytes, gigabytes, etc.). Additionally, the impact notification may provide the user with one or more undo capabilities and/or error correction capabilities. For example, the undo capabilities may enable the user to remove one or more packages that were added to the appliance, override a ban placed on one or more packages due to a conflicting dependency, override the removal of a package from the appliance due to a conflicting dependency, or otherwise undo one or more changes to the appliance. In addition, if a particular change to an appliance causes an error, inconsistency, or other issue that cannot be resolved automatically, the error correction capabilities may include displaying a warning or other notification together with one or more options or recommendations to correct the issue.

In one implementation, after the user has selected the packages, patterns, or other software components to be included in and/or banned from the appliance, the user may configure and personalize an image to be built for the appliance in an operation 270. For example, in operation 270, the user may configure the build to establish settings relating to locale, network configuration, identity management, login preferences, database configuration, storage and memory, or various other settings. Additionally, the user may personalize the build for the image in operation 270 to select logos, icons, backgrounds, or features to personalize the image. In one implementation, operation 270 may then include building a bootable image of the appliance, wherein one or more virtual machines may be launched to create a contained build environment within which the appliance image may be generated. The user may then deploy the appliance image for execution in one or more runtime environments (e.g., the user may download the appliance image for execution in a local runtime environment, load the appliance image within a hosted runtime environment, deploy the appliance image to a cloud computing environment, etc.). As such, the method illustrated in FIG. 2 and described herein may provide a simple and repeatable process for managing the creation of virtual appliances.

Figure 3:
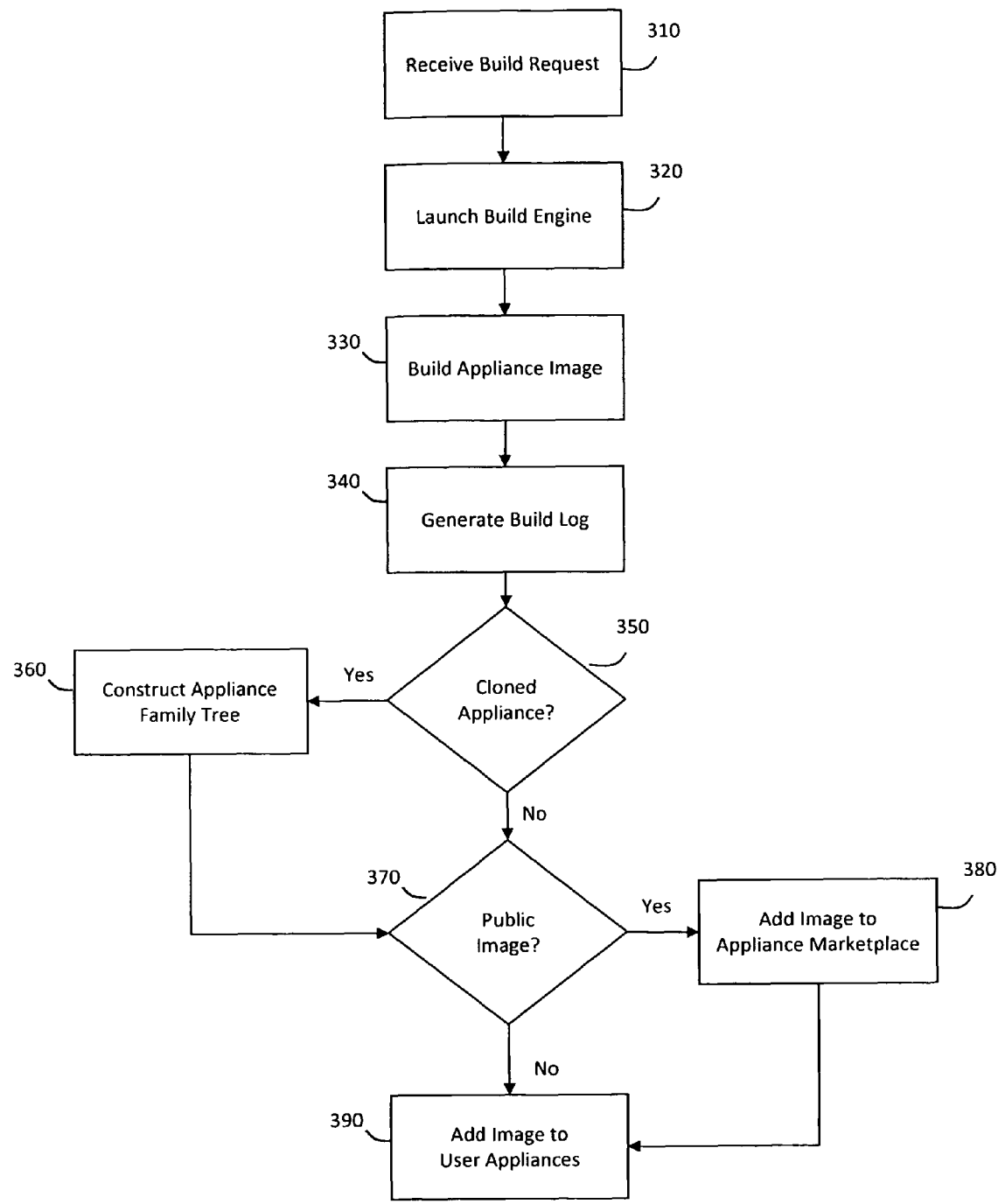
FIG. 3 illustrates a flow diagram of an exemplary method for building virtual appliances, according to one aspect of the invention.

According to one aspect of the invention, FIG. 3 illustrates a flow diagram of an exemplary method for building virtual appliances in a system for managing a virtual appliance lifecycle. In particular, one or more users may create, configure, personalize, and otherwise develop one or more appliances in a visualization environment, as described in further detail above. In one implementation, the virtualization environment may further include a build engine configured to build images (e.g., operating system images) of appliances that the users develop in the virtualization environment. For example, a typical process for installing an operating system generally includes installing various individual software components from a particular installation source, often requiring further manual user intervention. In contrast, the appliance images built using the build engine may generally include one file that encapsulates a complete operating system installation and/or various configurations for particular tasks or software components. As such, the appliance images may provide fully configured systems that can be executed in response to being deployed to an appropriate storage medium.

In one implementation, the method illustrated in FIG. 3 may be initiated in response to receiving a build request from a user in an operation 310. In particular, the build request may generally include an image description that provides various parameters defining the virtual appliance, including any software that the user has added to the appliance and any configurations and personalizations that the user has defined for the appliance and/or the software. Additionally, in one implementation, the build request may further include a format that the user has selected for the image (e.g., an HDD/USB disk image, an .iso live CD/DVD image, a .vmdk VMware virtual machine image, an .img Xen virtual machine image, etc.). The virtualization environment may then validate the image description to determine whether the image description includes the appropriate information needed to build the image (e.g., valid origin repositories and/or other sources for the software, valid directory structures, and configurations for the software, etc.). In one implementation, if the image description contains any errors or other invalid information, the virtualization environment may attempt to identify the errors and provide the user with warnings and/or options for resolving the errors (e.g., providing an option to install a specific package needed for a particular software configuration).

In one implementation, in response to the image description being validated, the virtualization environment may then launch the build engine in an operation 320. in particular, to launch the build engine in operation 320, the virtualization environment may load a virtual machine from a virtual machine pool to provide a contained environment within which the image may be built. For example, in one implementation, a snapshot of the build engine may be taken when the build engine is ready to build an image (e.g., following any initialization processes such as locating required build services, setting up logging mechanisms, etc.). As such, a subset of the virtual machines in the virtual machine pool may be in a pre-configured state corresponding to the snapshot of the initialized build engine, such that the pre-configured virtual machines may be used to reduce an amount of time needed to launch the build engine and initiate building the image. Moreover, providing the virtual machine within a contained environment may enable the build engine to build various different images corresponding to various different appliances in a substantially simultaneous and independent manner. For example, any particular build may generally begin with creating an encapsulated physical extend reachable at a root level, whereby contained build environments may provide independent physical extends for various simultaneous builds at the root level. Thus, the contained build environment launched in operation 320 may preserve resources that can be shared by various users across the virtualization environment.

In one implementation, the build engine may then build the appliance image within the contained build environment in an operation 330. In particular, in operation 330, the build engine may analyze the image description previously received in operation 310 and create a physical extend based on the image description within the contained build environment. For example, the physical extend may generally include a file system layout having a root directory and one or more sub-directories within the root directory. In one in implementation, the file system layout may further include a file layout identifying locations within the file system where one or more files are to be installed. After the physical extend and the corresponding file system layout has been created, operation 330 may further include creating the image (or logical extend) from the physical extend. For example, to create the image of the appliance, the build engine may retrieve the files to be installed within the directories and sub-directories of the file system (e.g., from the origin repositories, cached repositories, or other sources). The build engine may then copy the files to the image in accordance with the file system layout defined in the physical extend. As such, the image may include one file encapsulating the files corresponding to the software selected for the appliance, with the files being organized within the file system layout, and with the image being further configured and personalized according to any parameters that the user may have provided for the appliance.

In one implementation, operation 330 may further include the build engine formatting the image in accordance with the format that the user selected for the image. For example, in one implementation, the user may select a disk image format or an .iso image format, in which case the build engine may format the image for deployment onto physical media that can be executed in a suitable runtime environment. The disk image or .iso image may then be copied to a hard disk, USB stick, CD, DVD, or other physical media that can be mounted or otherwise installed for execution on a system. Alternatively, the disk image or .iso image may be copied to an OEM virtual disk that can be pre-loaded or otherwise installed for execution on the system. In another example, the user may select a .vmdk virtual disk format, in which case the build engine may format the image for deployment within a VMware virtual machine that can execute the image, or the user may select an .img virtual image format, in which case the build engine may format the image for deployment within a Xen hypervisor environment that can execute the image. As such, the build engine may support various formats for the image, which can then be deployed and executed within various different runtime environments.

In one implementation, the build engine may be further configured to monitor the build for the image during operations 320 and 330, such that an operation 340 may include generating one or more logs describing the build process. Thus, in one implementation, the build engine may display the current status for the build during operations 320 and 330 within a user interface. For example, the current status may include information such as an elapsed time for the build, a progress bar indicating a degree of completion for the build, and a current process being executed (e.g., "Setting up build environment," "Preparing system image," "Copying packages," "Creating boot ramdisk," etc.). As such, the build engine may continually record the current status for the build within one or more build logs and then finalize the build logs in operation 340 in response to build operations 320 and 330 completing. The build logs may therefore provide a record describing the various processes executed during the build in addition to any errors, problems, or other status changes that occurred during the build. For example, in one implementation, the build logs generated in operation 340 may include a Kiwi log describing creation of the image, a debugging log referencing files or other information used to create the image, or any other logs that provide a record of information relating to a build. Thus, the user may reference the build logs to debug or otherwise review the build process.

In one implementation, in response to the build engine successfully creating the image of the appliance, an operation 350 may include determining whether the appliance was created from a cloned appliance. For example, operation 350 may determine that the appliance was created from a cloned appliance if a user created the appliance from a JeOS template provided in the virtualization environment, an appliance previously created by the user in the virtualization environment, or an appliance published in the appliance marketplace. As such, in response to determining that the appliance was created from a cloned appliance, the image created for the appliance may be analyzed in an operation 360 to construct or otherwise update a family tree for the cloned appliance, as described in further detail below. On the other hand, in response to determining that the appliance was not created from a cloned appliance (e.g., if the user created the appliance from an imported Kiwi configuration file containing an appliance description), processing may proceed directly to an operation 370 to handle publishing the image created for the appliance, also described in further detail below.

In one implementation, as noted above, a family tree for the cloned appliance may be constructed or otherwise updated in operation 360 in response to determining that the appliance was created from a cloned appliance. In particular, as discussed above in connection with FIG. 1, the virtualization environment may provide an appliance marketplace within a panel or other interface that can be browsed and/or searched for various appliances that users of the virtualization environment have made publicly available. Thus, users of the virtualization environment may interact with the appliance marketplace to view information relating to the public appliances (e.g., list of packages, file system layouts, installed files, enabled services, amounts of gigabytes and/or megabytes for the appliances, etc.). In addition, the users may clone any of the appliances in the appliance marketplace and implement changes to the cloned appliance, such that various appliances may be derived from one another. As such, various relationships between the cloned appliance and the image built in operation 330 may be analyzed to construct the family tree in operation 360.

For example, in one implementation, the family tree may represent links between the cloned appliance and any appliances derived from the cloned appliance. In particular, the family tree may include a hierarchy having a parent node to represent the cloned appliance, with the parent node having one or more children nodes, grandchildren nodes, or other descendant nodes representing the derived appliances. As such, a relationship between the parent node and the children nodes may be represented with a branch connecting the parent node to the children nodes. In addition, at varying levels of the hierarchy, different appliances derived from the same cloned appliance may be represented as sibling nodes. Thus, the family tree may arrange various nodes in a hierarchy to represent the various relationships for cloned and derived appliances, while changes or other differences among the related appliances may be analyzed to enhance the information provided in the appliance marketplace. Thus, operation 360 may include analyzing the related appliances in the family tree according to one or more data mining algorithms, heuristic algorithms, and/or other analytic techniques to derive knowledge relating to the changes or other differences among the related appliances.

As such, in one implementation, operation 360 may include analyzing the appliances linked to one another in the family tree may to organize the appliances into one or more clusters (e.g., related appliances incorporating similar changes to a cloned appliance). As such, the clusters may then be further analyzed to identify one or more "best changes," "recommended changes," and/or "popular changes." In addition, information relating to the changes between the various appliances in the family tree may be represented along branches between the nodes of the hierarchy (e.g., indicating that a derived appliance has changed background graphics, disabled certain services, added and/or removed certain packages, or made other changes to the cloned appliance). Thus, in one implementation, the branches of the family tree may be associated with metadata describing the changes or other differences from the parent nodes to their respective children nodes, while each node in the hierarchy nodes may be associated with further metadata describing the respective node's cluster membership, popularity metric, trust metric, or other descriptive information. Furthermore, in one implementation, sibling nodes (i.e., appliances derived from the same cloned appliance) may be analyzed to derive further knowledge relating to the family tree (e.g., if various different users clone a particular appliance and make similar changes, a developer of the cloned appliance may be interested in determining whether or not those changes should be applied to the cloned appliance).

Thus, in one implementation, constructing the appliance family tree in operation 360 may provide various forms of knowledge that may be used to manage the lifecycle of the appliances in the family tree, including changes that should be made to subsequent versions of an appliance, trends or patterns for creating new base products, and trends or patterns for modifying behavior or functionality in the virtualization environment, among other things. For example, any users browsing and/or searching the appliance marketplace may view the changes between parent nodes, children nodes, sibling nodes, and other related nodes to distinguish the different yet related appliances (e.g., a user may consider a particular sibling node's popularity metric to distinguish various sibling nodes that incorporate the same "best changes"). In another example, changes implemented in derived appliances may be used to update or otherwise optimize earlier generations of the appliances (e.g., the "best changes," "popular changes," "recommended changes," or other changes may be assembled into a package that can update earlier generations and apply the relevant changes, as described in further detail in U.S. patent application Ser. No. 12/476,175, entitled "System and Method for Supporting a Virtual Appliance," filed on an even date herewith, the disclosure of which is hereby incorporated by reference in its entirety). In still another example, the changes may be further analyzed to provide feedback that can be used to optimize or otherwise modify behavior or functionality of the virtualization environment (e.g., if many users are employing certain configuration options when configuring appliances, while a smaller number users employ other configuration options, such knowledge may be used to make informed choices regarding the configuration options to be presented within a default configuration interface versus an advanced configuration interface).

In one implementation, if the appliance was not derived from a cloned appliance, or alternatively in response to successfully constructing the family tree in operation 360, publication of the image may be managed in an operation 370. In particular, a publication prompt may be presented to the user that created the appliance, wherein the publication prompt may enable the user to establish whether or not the image of the appliance is to be made publicly visible. Thus, in response to the user indicating that the appliance is to be published, the image may be added to the appliance marketplace in an operation 380, thereby enabling other users to view and optionally clone the published appliance, and the image may further be added to the user's appliances in an operation 390. Alternatively, in response to the user indicating that the appliance is not to be published, the image may only be added to the user's appliances in operation 390 (i.e., the image will be visible to the user that created the appliance, but will not be visible to other users of the virtualization environment). However, in one implementation, the image of the unpublished appliance may be made visible to limited users (e.g., other users in a friend list for the user, other users that created earlier generations of the unpublished appliance, other users that created appliances in the same family tree as the unpublished appliance, etc.).

As such, in one implementation, completed builds of appliance images may be persistently stored in one or more of the user's appliances and the appliance marketplace, and the user may be provided with various options for managing the appliance images. For example, names, version numbers, image formats, compressed and uncompressed sizes, build dates, architectures, installed packages, and/or other information describing the appliance images may be displayed within a user interface. Furthermore, the user may optionally delete any, download, clone, publish, deploy, or otherwise manage any of the images.

Figure 4:
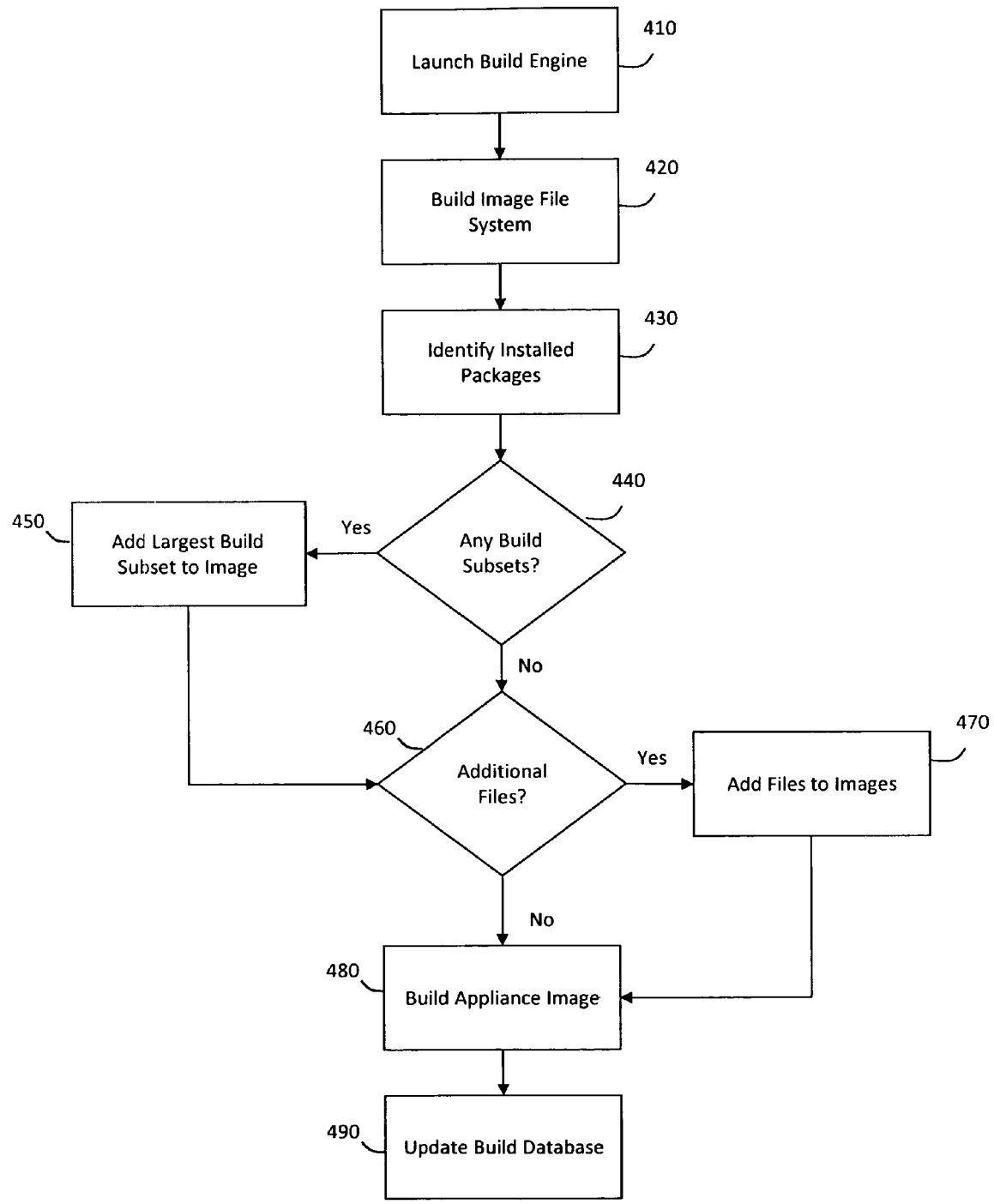
FIG. 4 illustrates a flow diagram of an exemplary method for efficiently building virtual appliances with pre-built appliance subsets, according to one aspect of the invention.

According to one aspect of the invention, FIG. 4 illustrates a flow diagram of an exemplary method for using pre-built appliance subsets to efficiently build virtual appliances in a hosted environment. In particular, the method illustrated in FIG. 4 may be initiated in a similar manner as discussed above in connection with FIG. 3, wherein an operation 410 may include launching the build engine in response to receiving a build request that includes an image description for a virtual appliance. For example, in one implementation, launching the build engine in operation 410 may include validating the image description to identify various packages, patterns, and other software components installed for appliance, one or more source repositories containing the packages, patterns, and other software components installed for appliance, and any configuration and/or personalization options to be applied to the appliance.

In one implementation, launching the build engine in operation 410 may further include loading a virtual machine from a virtual machine pool to provide a contained environment for building the image in a hosted environment. For example, the loaded virtual machine may have a pre-configured state corresponding an initialized state of the build engine, such that building the image may be initiated in an efficient manner (i.e., various initialization processes for the build engine may be avoided, thereby streamlining the build process for remote client devices connected that are connected to the hosted environment). Moreover, as noted above, building the image within a contained environment may enable the build engine to build various different images corresponding to various different appliances in a substantially simultaneous and independent manner (i.e., thereby preserving resources that can various users of the hosted virtualization environment can share).

In one implementation, in response to launching the build engine in operation 410, the image for the appliance may then be built from the image description. In particular, the image description may generally include various packages, patterns, and other software components installed for the appliance, and may optionally further include any configuration and/or personalization options to be established for the appliance. As such, to initiate building the image, an operation 420 may include building a file system for the appliance, wherein the file system may generally include a directory structure defining a layout for all of the directories and sub-directories for the appliance. In addition, the directory structure may further define a layout for all of the files to be installed for the appliance, and may further define locations within the directory structure where such files are to be installed. As such, operation 420 may include building a file system having a layout for various directories, sub-directories, and files to be installed, wherein the file system may provide a root directory for the image.

In one implementation, in response to building the file system for the image, an operation 430 may include identifying the various packages, patterns, and other software components corresponding to the files to be installed within the file system created in operation 420. To efficiently build the image for the appliance in the hosted environment, an operation 440 may then determine whether any pre-built appliance subsets are available for the image that the build engine is currently building. For example, as described above in connection with FIG. 3, building an image may generally include retrieving all of the files to be installed for the appliance from one or more source repositories and then copying such files to the image in accordance with the directory structure defined for the file system. As such, in one implementation, the build engine may be create various reusable archives corresponding to various images that are successfully built, wherein the reusable archives may provide pre-built appliance subsets for subsequent images to be built. For example, in response to successfully creating the file system for a particular image and copying all of the files to the image in accordance with the directory structure layout, a reusable archive may be created from the file system (e.g., the reusable archive may be a tarball that collects all of the files installed for the image within one file, while preserving information relating to the file system).

Thus, in one implementation, the build engine may create various reusable archives in response to successfully creating corresponding images, wherein the reusable archives may be stored in a build database coupled to the build engine. Further, as noted above in connection with FIG. 1, each of the packages, patterns, and other software components installed for the appliance may be associated with a current version described in metadata (e.g., a unique MD5 identifier). As such, the build engine may further associate each of the reusable archives that are stored in the build database with a manifest file, which may include a list of all of the packages, patterns, and other software components installed for the appliance. Accordingly, in one implementation, operation 440 may include referencing the manifest files for the various reusable archives stored in the build database to determine whether any of the reusable archives are a perfect subset of the image currently being built. In particular, a given reusable archive may be a perfect subset of the current image if every file installed in the reusable archive is to be installed for the current image (i.e., the reusable archive is not a perfect subset if the archive includes additional files that are not to be installed for the current image).

In one implementation, in response to determining that one or more of the reusable archives provide a pre-built subset for the current image, an operation 450 may include adding a largest one of the reusable archives to the current image. In particular, the largest subset may accelerate the build for the current image in an optimally efficient manner, such that adding the largest reusable archive that is a perfect subset provides the largest efficiency to the build process. Thus, operation 450 may un-archive the largest pre-built appliance subset and copy the un-archived subset to the image. Thereafter (or alternatively if none of the reusable archives are a perfect subset of the current image), an operation 460 may include determining whether any additional files need to be installed for the image. For example, if five packages are to be installed for a particular image and the largest perfect subset only includes four of the five packages, operation 460 may determine that the additional package remains to be installed. As such, in response to determining that additional files need to be installed for the image, an operation 470 may include adding such files to the image.

In one implementation, in response to successfully creating the file system for the image and then copying all of the files to the image, an operation 480 may include building the operating system image for the appliance. For example, in one implementation, building the image in operation 480 may further include applying any configuration and/or personalization options that may have been defined for the appliance, and may further include formatting the image in accordance with a format defined in the build request (e.g., a disk image format, a virtual disk image format, etc.). As such, the image may be formatted in a manner that enables the image to be deployed for execution in a suitable runtime environment. Furthermore, in one implementation, building the image for the appliance may further include associating the operating system image with a boot image, wherein the boot image may include a file system specifically configured to boot the appliance. As such, the image built in operation 480 may be one file encapsulating the file systems and all of the files for the operating system image and the boot image, wherein the image may optionally be further configured and personalized according to the provided options.

In one implementation, the build engine may then update the build database in an operation 490, wherein updating the build database may include archiving the file system for the image and adding the archived file system to the reusable archives in the build database. As such, the archived file system for the current image may then be used to efficiently build subsequent images for which the archived file system is a perfect subset (e.g., subsequent versions of the appliance for which one or more additional packages have been installed).

Furthermore, although the foregoing description of FIG. 4 has been described in the context of building a particular appliance image, the techniques described herein may be applied in various ways to enhance behavior and functionality within the virtualization environment. For example, in one implementation, similar techniques may be used to create reusable archives for the boot images used to boot operating system images for appliances. In particular, an operating system image may generally require a boot image in order to be loaded in a suitable runtime environment, whereby the reusable boot image archives may be referenced in a similar manner as described above in order to be efficiently added to the deployable appliance. However, to add a reusable boot image archive to the appliance, the build engine may determine whether the appliance includes any configuration and/or personalization options that apply changes to the boot image archive, and may further modify the boot image archive in view of the changes prior to being added to the appliance. For example, in response to a personalization option applying a custom graphic that changes branding on a boot screen in a boot image archive, the build engine may un-archive the boot image archive, remove any relevant graphics from the file system of the un-archived boot image, and then copy the custom graphic to the file system of the boot image to change the boot screen branding.

In addition, in one implementation, the virtualization environment may be configured to analyze activity in the virtualization environment to identify candidates for populating the build database with reusable archives. For example, the virtualization environment may analyze activity relating to cloned JeOS templates, cloned appliances in the appliance marketplace, family trees constructed for the cloned appliances, or other activity that may be relevant to determining candidates for reusable archives that will likely be subject to frequent building. For example, popular or highly rated appliances may be identified based on statistics (e.g., a number of positive votes, downloads, derived appliances, etc.), wherein reusable archives corresponding to the popular or highly rated appliances may be created to populate the build database. In particular, the popular or highly rated appliances may be likely candidates for images that the build engine creates most often, whereby using such appliances to populate the build database may be likely to improve build times for a substantial number of users. Thus, in one implementation, the method illustrated in FIG. 4 and described herein may be used to periodically initiate builds for various public appliances and populate the build database with reusable archives.

Furthermore, in one implementation, the build database may be queried at periodic intervals to identify any of the reusable archives that can be deleted (e.g., archives that have not been referenced for a given amount of time), and may further identify any reusable archives that need to be modified. For example, as noted above, the reusable image archives may be associated with a manifest file that includes a listing of the packages, patterns, and other software components installed for the appliance in addition to corresponding unique identifiers. Thus, in one implementation, the repository metadata server described above in connection with FIG. 1 may be configured to detect upstream updates to packages, patterns, and other software components contained in one or more origin repositories. Accordingly, in response to detecting an upstream update, any reusable archives associated with the updated packages, patterns, and other software components may be invalidated because such archives include outdated information, wherein the method illustrated in FIG. 4 and described herein may then be invoked to rebuild such archives in view of the upstream updates.

Figure 5:
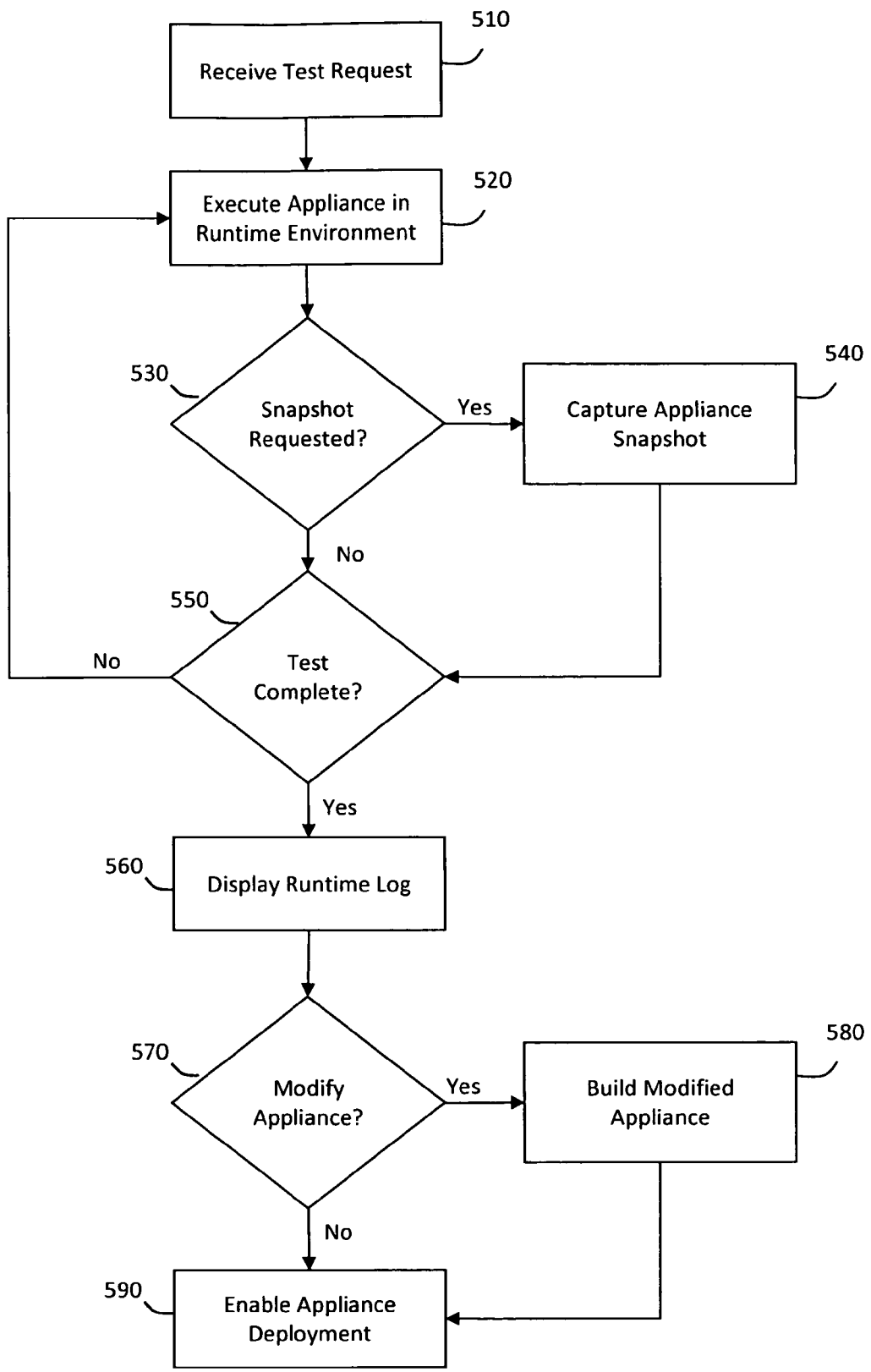
FIG. 5 illustrates a flow diagram of an exemplary method for testing virtual appliances, according to one aspect of the invention.

According to one aspect of the invention, FIG. 5 illustrates a flow diagram of an exemplary method for testing virtual appliances in a system for managing a virtual appliance lifecycle. In particular, the virtualization environment may generally store completed images built for various appliances, wherein users may execute one or more of the images in a runtime environment hosted at the virtualization environment to test the corresponding appliances. Alternatively (or additionally), users may upload one or more images to the virtualization environment and execute the uploaded images in the runtime environment (i.e., images may be tested using the runtime environment hosted at the virtualization environment, regardless of whether or not the image was built within the virtualization environment). In one implementation, the method illustrated in FIG. 5 may be initiated in response to receiving a test request from a user in an operation 510. In particular, the test request may generally include an identifier for an image to be executed in the hosted runtime environment, and may optionally further include one or more parameters for executing the image (e.g., user name and password, enabled and disabled services, etc.).

In one implementation, an operation 520 may include the virtualization environment launching the runtime environment in response to receiving the test request in operation 510. In particular, the virtualization environment may load a virtual machine from a virtual machine pool to provide a contained runtime environment for executing the image. For example, one or more snapshots of the runtime environment may be taken when the runtime environment is ready to execute one or more images having typical runtime characteristics (e.g., default services enabled and/or disabled, network configurations, etc.). As such, a subset of the virtual machines in the virtual machine pool may be in a pre-configured state corresponding to the snapshots of the initialized runtime environment, such that the pre-configured virtual machines may be used to reduce an amount of time needed to launch the runtime environment and initiate executing the image. Moreover, providing the virtual machine within a contained environment may permit various different images corresponding to various different appliances to be executed in a substantially simultaneous and independent manner. For example, any particular image may generally be executed at a root level, whereby contained runtime environments may permit different images to be executed simultaneously at the root level. Thus, the contained runtime environment launched in operation 520 may preserve resources that can be shared by various users across the virtualization environment.

In one implementation, the image may then be executed within the contained runtime environment in operation 520. In particular, one of the pre-configured virtual machines having similar runtime characteristics as the image identified in the test request may be loaded, such that the image may be executed within the appropriate pre-configured virtual machine in operation 520. Alternatively, in one implementation, multiple virtual machines may be loaded for a particular image to provide independent runtime environments for the image (e.g., enabling the user to test different configurations, operational characteristics, or other aspects of the image in a parallel and/or independent manner). As such, in one implementation, the image may be booted within a guest operating system associated with the contained runtime environment, wherein the user can reconfigure the appliance, install and/or uninstall additional software, or execute any other task that the image supports at runtime without having to download or otherwise deploy the image to another runtime environment.

In one implementation, the user may create a "snapshot" of the image at any point during the execution of the appliance in operation 520. As such, an operation 530 may include continuously or intermittently determining whether a request to create a snapshot of the appliance was received. In response to determining that a snapshot request was received, the snapshot may then be captured in an operation 540. The snapshot may generally capture an entire state of the image at any particular point, wherein the snapshot may then be used in various ways to manage the appliance. For example, the user may capture the snapshot after performing various tasks while executing the image in the runtime environment, such that the snapshot can subsequently be loaded to rebuild the image in a state corresponding to the captured snapshot (e.g., the user may capture a snapshot prior to performing a particular task likely to cause errors or other problems, such that the snapshot can be used to restore the image to the pristine state from prior to when the particular task was performed). In another example, a state of the image may be captured in response to the image successfully booting to provide a snapshot that can be executed without requiring a boot. As such, a state of the image may be captured at any particular time, such that the appliance can be restored to a runtime state corresponding to the snapshot.

Furthermore, in one implementation, the snapshot capturing capabilities provided in operation 540 may be used to manage various aspects of the appliance lifecycle. For example, the snapshot may correspond to a crashed state for the appliance, whereby the snapshot can then be provided to an appropriate entity for debugging the appliance in the crashed state (e.g., as described in further detail in U.S. patent application Ser. No. 12/476,175, entitled "System and Method for Supporting a Virtual Appliance," filed on an even date herewith, the disclosure of which is hereby incorporated by reference in its entirety). In another example, if the image is to be deployed onto a particular storage medium, the runtime environment may be configured to resize the image to ensure that the image can fit on the storage medium (e.g., if a hard disk has a limited amount of available space, the image may be resized to fit within the available space). Thus, in one implementation, various snapshots corresponding to different optimizations performed for different runtime environments may be taken for the image, wherein the various snapshots may be built into the image, thereby enabling the image to be deployed to a particular runtime environment using an appropriate one of the various snapshots (e.g., hardware for a particular runtime environment may be probed to determine a configuration for the image, such that a snapshot of the configured image may provide a suitable state for executing the image in that runtime environment).

In one implementation, an operation 550 may include continuously or intermittently determining whether the user has provided an indication that the user has completed testing or otherwise executing the image. Thus, executing the image may include iteratively repeating operations 520 through 550 until the user provides an indication that the user has completed testing or otherwise executing the image. In one implementation, the iterative execution of the image may enable the user to capture various snapshots for the image at different points in time, wherein the various snapshots may further enable management of the appliance lifecycle. For example, a first snapshot may be captured at a first point in time, and a second snapshot may be captured at a subsequent point in time, wherein any changes or other differences between the first snapshot and the second snapshot may be attributed to any runtime activity that occurred between the first point in time and the subsequent point in time (e.g., an installer program may be executed after capturing the first snapshot, and the second snapshot may then be captured to identify particular changes that are caused by the installer program). In this manner, different snapshots taken at different points in time may be compared to one another to provide feedback for auditing one or more specific activities (e.g., simplifying development for installer scripts or cross-platform software, generating encryption activity records for security management, tracking relationships between different versions of an appliance, etc.).

In one implementation, in response to the user indicating that the test or context for executing the image has completed, one or more runtime logs may be displayed in an operation 560. For example, as noted above, the hosted runtime environment may include a monitoring engine having one or more appliance management utilities for monitoring the execution that occurs during operation 520 (e.g., as described in further detail in U.S. patent application Ser. No. 12/476,210, entitled "System and Method for Inspecting a Virtual Appliance Runtime Environment," filed on an even date herewith, the disclosure of which is hereby incorporated by reference in its entirety). The appliance management utilities may therefore be used to generate the runtime logs displayed in operation 560, wherein the runtime logs may identify any files that were modified, unused, or underused during execution of the appliance image (e.g., whether and/or to what certain packages, patterns, components, or other aspects of the appliance were used or changed during the execution).

In particular, in one implementation, the runtime logs may include any files that were modified subsequent to the image being loaded in the runtime environment, and may further include information specifically describing the manner in which such files were modified. For example, if the appliance is configured to employ the SSH network protocol to provide encryption over secure channels, one or more authentication keys may be automatically generated when the appliance initially boots. As such, the runtime logs displayed in operation 560 would include the automatically generated encryption keys, which could then be used to appropriately configure a network management system where the appliance will eventually be deployed. Furthermore, the runtime logs may include any files that were unused or underused subsequent to the image being loaded in the runtime environment, and may further include information specifically describing the manner in which such files were unused or underused. For example, if one or more files were not referenced or otherwise used when the image was executed, the runtime logs may identify such files and mark the unused files for deletion (e.g., to reduce a footprint for the appliance). In addition, the runtime logs may further include a package-level breakdown for unused files, wherein a percentage, ratio, or other metric may be used to represent utilization levels for specific packages. For example, the runtime logs may indicate that ninety percent of the files included in a first package were referenced or otherwise used when the image was executed, while only ten percent of the files in a second package were referenced or otherwise used (e.g., wherein the second package may be recommended for removal from the appliance).

In one implementation, the user may interact with the runtime logs and determine whether or not to modify the appliance in view of any captured snapshots and/or any activity recorded in the runtime logs. As such, in response to an operation 570 determining that the user has provided a request to modify the appliance, a modified version of the appliance may be built in operation 580. For example, the modified version of the appliance built in operation 580 may include an image encapsulating one or more of the snapshots captured in operation 540, wherein the snapshots may be loaded to deploy the appliance in a specific state corresponding to one or more of the snapshots. Furthermore, in one implementation, operation 560 may include displaying the runtime logs in a selectable manner, such that the user can precisely view any modifications that occurred during execution (e.g., lines that were added to, deleted from, and/or otherwise modified in a particular file), in addition to an impact of the modifications (e.g., an amount of data associated with various unutilized and/or underutilized packages). As such, the user may review the runtime logs and individually select one or more changes to apply in the modified version of the appliance to be built in operation 580. For example, a user may change a keyboard layout from English to French/Canadian and select the particular changes in the runtime logs for the change in keyboard layout to build a modified appliance configured with a French/Canadian keyboard layout. Thus, the user may view the runtime logs and individually select (or unselect) any of the file modifications, unutilized files, and/or underutilized files, wherein the modified appliance may be built in response to the selected (or unselected) changes.

In one implementation, after the user has suitably executed the image and/or built one or more images corresponding to modified versions of the appliance, an operation 590 may include enabling deployment for the appliance to any suitable runtime environment. Alternatively (or additionally), the user may provide a request to re-deploy the appliance in the hosted runtime environment, in which case the method illustrated in FIG. 5 may be repeated, beginning with operation 510. Thus, operation 590 may include enabling deployment for any appliances that the user has created in and/or uploaded to the virtualization environment, appliances published in the appliance marketplace, appliances corresponding to certain JeOS templates, and/or any other suitable appliances.

For example, in one implementation, the user may download one or more images from the virtualization environment to a client device for execution in an appropriate runtime environment at the client device. Alternatively, in one implementation, the user may load the image for execution at the client device using bootstrapped network installation. For example, the image may include a Preboot execution Environment (PXE), which may be configured to bootstrap the client device and load the image in the runtime environment (i.e., without the image being downloaded to the client device).

Alternatively, instead of downloading or otherwise executing the image at the client device (e.g., because of bandwidth constraints), the user may deploy one or more images to a runtime environment on a host web server or another suitable processing resource where the image can be hosted and executed in an appropriate runtime environment. Additionally, in one implementation, one or more images may be deployed directly to a cloud or virtualized computing environment (e.g., the Amazon Elastic Compute Cloud), wherein the deployed images may be executed in the cloud computing environment. For example, the Amazon Elastic Compute Cloud (EC2) environment is generally provided as a commercial web service in which users can create virtual server instances to deploy hosted applications in a scalable manner. Thus, because the Amazon EC2 environment provides cloud computing services using Xen virtual machine instances that function as virtual private servers, deploying a particular appliance to the Amazon EC2 environment (or another suitable cloud or virtualized computing environment) may include building a Xen virtual machine image for the appliance, which can then be deployed directly to the cloud or virtualized computing environment. However, although the example provided above describes deployment to the Amazon EC2 environment, the appliance may be similarly deployed to any other cloud, virtualized, or other hosted computing environment suitably capable of loading and executing images.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A system for efficiently building virtual appliances in a hosted environment, comprising:
    a build database configured to store reusable image archives having file systems with one or more files installed in one or more directories, wherein the reusable image archives collect all the files installed in the one or more directories and preserve information relating to the one or more directories associated with the file systems;
    a build engine configured to:
        associate the reusable image archives stored in the build database with manifest files that list unique identifiers associated with one or more software components corresponding to all the files installed in the one or more directories associated with the reusable image archive file systems;
        receive a build request that includes an image description associated with a virtual appliance;
        create, from the image description associated with the virtual appliance, a root file system having a root directory structure that defines a layout associated with all files and directories to install in an operating system image associated with the virtual appliance;
        add all the files in the file system associated with one of the reusable image archives that provides a perfect subset of the root file system to the root directory structure in the operating system image associated with the virtual appliance, wherein the one of the reusable image archives provides the perfect subset of the root file system when all the files in the file system associated therewith are to be installed in the operating system image associated with the virtual appliance; and
        build the operating system image associated with the virtual appliance, wherein the operating system image includes all the files and directories installed therein in accordance with the root directory structure that defines the layout associated therewith;
    a repository metadata server configured to detect an update to one or more software components stored in one or more source repositories; and
    a virtualization environment configured to:
        invalidate all the reusable image archives associated with manifest files that list unique identifiers associated with the one or more updated software components; and
        invoke the build engine to rebuild the file systems associated with the invalidated reusable image archives, wherein the rebuilt file systems have one or more files corresponding to the one or more updated software components installed in the one or more directories associated therewith.

2. The system of claim 1, wherein the build engine is further configured to:
    create, from the image description associated with the virtual appliance, a boot file system having a boot directory structure that defines a layout associated with all files and directories to install in a boot image associated with the virtual appliance;
    add all the files in the file system associated with another one of the reusable image archives that provides a perfect subset of the boot file system to the boot directory structure in the boot image associated with the virtual appliance;
    build the boot image associated with the virtual appliance, wherein the boot image includes all the files and directories installed therein in accordance with the boot directory structure that defines the layout associated therewith; and
    build an appliance image corresponding to the virtual appliance, wherein the appliance image includes the operating system image and the boot image.

3. The system of claim 2, wherein the build engine is further configured to:
    identify at least one personalization option in the build request that applies a custom graphic to a boot screen associated with the virtual appliance, wherein the files the file system associated with the other reusable image archive include a boot screen graphic file; and
    replace the boot screen graphic file in the file system associated with the other reusable image archive with the custom graphic prior to adding all the files in the file system associated with the other reusable image archive to the boot directory structure in the boot image associated with the virtual appliance.

4. The system of claim 1, wherein the build engine is further configured to reference the manifest files associated with the reusable image archives to identify the one of the reusable image archives that provides the perfect subset of the root file system created from the image description associated with the virtual appliance.

5. The system of claim 1, wherein the build engine is further configured to determine that more than one of the reusable image archives provide the perfect subset of the root file system created from the image description associated with the virtual appliance, wherein the one of the reusable image archives used to add all the files in the file system associated therewith comprises the largest reusable image archive among the more than one reusable image archives.

6. The system of claim 1, wherein the build engine is further configured to:
    identify one or more remaining files to install in the operating system image associated with the virtual appliance subsequent to all the files in the file system associated with the one of the reusable image archives having been added to the root directory structure in the operating system image associated with the virtual appliance;

retrieve the one or more remaining files from one or more source repositories, wherein the image description associated with the virtual appliance identifies the one or more source repositories that store the one or more remaining files; and install the one or more remaining files retrieved from the one or more source repositories in the operating system image associated with the virtual appliance in accordance with the root directory structure that defines the layout associated therewith.

7. The system of claim 1, further comprising a virtualization environment configured to:

identify one or more popular or highly rated public appliances based on one or more statistics or metrics that relate to cloning, usage, and voting activity in the virtualization environment;

invoke the build engine to create appliance images that correspond to the one or more popular or highly rated public appliances; and add archived file systems associated with the appliance images that correspond to the one or more popular or highly rated public appliances to the reusable image archives stored in the build database, wherein the archived file systems added to the reusable image archives collect every file installed in the one or more popular or highly rated public appliances and preserve information relating to a directory structure associated with the one or more popular or highly rated public appliances.

8. The system of claim 1, further comprising a virtualization environment configured to:

identify one or more of the reusable image archives stored in the build database that have not been referenced in a predetermined amount of time; and delete the one or more reusable image archives that have not been referenced in the predetermined amount of time from the build database.

9. The system of claim 1, wherein the root directory structure further defines locations in the one or more directories where all the files associated with the operating system image are to be installed.

10. The system of claim 1, wherein the reusable image archives stored in the build database comprise individual tarball files that collect all the files installed in the one or more directories associated therewith and preserve the information relating to the one or more directories associated therewith.

11. The system of claim 1, wherein the image description associated with the virtual appliance lists unique identifiers associated with one or more software components that correspond to all the files to install in the operating system image associated with the virtual appliance and identifies one or more source repositories that store the one or more software components associated with the unique identifiers listed in the image description.

12. The system of claim 1, wherein the build engine is further configured to add an archive corresponding to the root file system associated with the built operating image to the reusable image archives stored in the build database, wherein the archived root file system comprises an individual tarball file that collects all the files installed in the built operating system image and preserves information relating to the root directory structure that defines the layout associated therewith.

13. The system of claim 12, wherein the build engine is further configured to add all the files collected in the individual tarball file that corresponds to the archived root file system to the root directory structure in a subsequent version associated with the virtual appliance to rebuild the operating system image associated therewith if the archived root file system represents a perfect subset of the root directory structure in the subsequent version associated with the virtual appliance.

14. A computer-implemented method for efficiently building virtual appliances in a hosted environment, comprising:

storing, in a build database reusable image archives having file systems with one or more files installed in one or more directories, wherein the reusable image archives collect all the files installed in the one or more directories and preserve information relating to the one or more directories associated with the file systems;

associating the reusable image archives stored in the build database with manifest files that list unique identifiers associated with one or more software components that correspond to all the files installed in the one or more directories associated with the reusable image archive file systems;

receiving a build request at a build engine, wherein the build request includes an image description associated with a virtual appliance;

creating, from the image description associated with the virtual appliance using the build engine, a root file system having a root directory structure that defines a layout associated with all files and directories to install in an operating system image associated with the virtual appliance;

adding all the files in the file system associated with one of the reusable image archives stored in the build database that provides a perfect subset of the root file system to the root directory structure in the operating system image associated with the virtual appliance, wherein the one of the reusable image archives provides the perfect subset of the root file system when all the files in the file system associated therewith are to be installed in the operating system image associated with the virtual appliance;

building the operating system image associated with the virtual appliance using the build engine, wherein the operating system image includes all the files and directories installed therein in accordance with the root directory structure that defines the layout associated therewith;

detecting, at a repository metadata server, an update to one or more software components stored in one or more source repositories;

invalidating all the reusable image archives stored in the build database associated with manifest files that list unique identifiers associated with the one or more updated software components; and invoking the build engine to rebuild the file systems associated with the invalidated reusable image archives, wherein the rebuilt file systems have one or more files corresponding to the one or more updated software components installed in the one or more directories associated therewith.

15. The method of claim 14, further comprising:

creating, from the image description associated with the virtual appliance using the build engine, a boot file system having a boot directory structure that defines a layout associated with all files and directories to install in a boot image associated with the virtual appliance;

adding all the files in the file system associated with another one of the reusable image archives stored in the build database that provides a perfect subset of the boot file system to the boot directory structure in the boot image associated with the virtual appliance;

building the boot image associated with the virtual appliance using the build engine, wherein the boot image includes all the files and directories installed therein in accordance with the boot directory structure that defines the layout associated therewith; and building an appliance image corresponding to the virtual appliance using the build engine, wherein the appliance image includes the operating system image and the boot image.

16. The method of claim 15, further comprising:

identifying at least one personalization option in the build request that applies a custom graphic to a boot screen associated with the virtual appliance, wherein the files the file system associated with the other reusable image archive include a boot screen graphic file; and replacing the boot screen graphic file in the file system associated with the other reusable image archive with the custom graphic prior to adding all the files in the file system associated with the other reusable image archive to the boot directory structure in the boot image associated with the virtual appliance.

17. The method of claim 14, further comprising referencing the manifest files associated with the reusable image archives stored in the build database to identify the one of the reusable image archives that provides the perfect subset of the root file system created from the image description associated with the virtual appliance.

18. The method of claim 14, wherein adding all the files in the file system associated with the one of the reusable image archives to the root directory structure in the operating system image associated with the virtual appliance includes:

determining, at the build engine, that more than one of the reusable image archives provide the perfect subset of the root file system created from the image description associated with the virtual appliance; and selecting the one of the reusable image archives used to add all the files in the file system associated therewith to the root directory structure associated with the virtual appliance comprises the largest reusable image archive among the more than one reusable image archives.

19. The method of claim 14, further comprising:

identifying one or more remaining files to install in the operating system image associated with the virtual appliance subsequent to all the files in the file system associated with the one of the reusable image archives having been added to the root directory structure in the operating system image associated with the virtual appliance;

retrieving the one or more remaining files from one or more source repositories, wherein the image description associated with the virtual appliance identifies the one or more source repositories that store the one or more remaining files; and installing the one or more remaining files from the one or more source repositories in the operating system image associated with the virtual appliance in accordance with the root directory structure that defines the layout associated therewith.

20. The method of claim 14, wherein the reusable image archives stored in the build database comprise individual tarball files that collect all the files installed in the one or more directories associated therewith and preserve the information relating to the one or more directories associated therewith.

21. The method of claim 14, further comprising:

identifying one or more popular or highly rated in a virtualization environment associated with the build engine based on one or more statistics or metrics that relate to cloning, usage, and voting activity in the virtualization environment;

invoking the build engine to create appliance images that correspond to the one or more popular or highly rated public appliances;

adding archived file systems associated with the appliance images that correspond to the one or more popular or highly rated public appliances to the reusable image archives stored in the build database, wherein the archived file systems added to the reusable image archives collect every file installed in the one or more popular or highly rated public appliances and preserve information relating to a directory structure associated with the one or more popular or highly rated public appliances.

22. The method of claim 14, further comprising:

identifying one or more of the reusable image archives stored in the build database that have not been referenced in a predetermined amount of time; and deleting the one or more reusable image archives that have not been referenced in the predetermined amount of time from the build database.

23. A computer-implemented method for efficiently building virtual appliances in a hosted environment, comprising:

building a file system corresponding to a base appliance using a build engine, wherein the file system corresponding to the base appliance includes one or more files installed in one or more directories;

associating the base appliance with a manifest file that lists unique identifiers associated with one or more software components that correspond to the one or more files installed in the one or more directories associated with the base appliance file system;

invalidating the base appliance in response to a repository metadata server detecting an update to the one or more software components associated with the unique identifiers listed in the manifest file associated with the base appliance;

invoking the build engine to rebuild the file system corresponding to the invalidated base appliance, wherein the one or more files installed in the one or more directories associated with the rebuilt file system correspond to the one or more updated software components associated with the unique identifiers listed in the manifest file;

receiving a build request at the build engine, wherein the build request includes an image description associated with a virtual appliance derived from the base appliance;

creating, at the build engine from the image description associated with the virtual appliance derived from the base appliance, a root file system having a root directory structure that defines a layout associated with all files and directories to install in an image associated with the virtual appliance derived from the base appliance;

adding all the files in the rebuilt file system corresponding to the base appliance to the root directory structure in the image associated with the virtual appliance derived from the base appliance if the rebuilt file system corresponding to the base appliance represents a perfect subset of the root directory structure in the image associated with the derived virtual appliance, wherein the rebuilt file system represents the perfect subset of the root directory structure when all the files in the rebuilt file system are to be installed in the image associated with the virtual appliance derived from the base appliance;

installing one or more additional files remaining to be installed in the image associated with the derived virtual appliance subsequent to adding all the files in the rebuilt file system corresponding to the base appliance to the root directory structure in the image associated with the derived virtual appliance; and building the image associated with the derived virtual appliance using the build engine, wherein the image associated with the derived virtual appliance has all the files in the rebuilt file system corresponding to the base appliance and the one or more additional files installed in the directories in accordance with the root directory structure that defines the layout associated therewith.

24. The method of claim 23, further comprising adding an archive corresponding to the root file system in the image associated with the derived virtual appliance to a build database, wherein the build engine can use the archived root file system added to the build database to reduce a time to build subsequent appliances that derive the base appliance or the virtual appliance derived from the base appliance.

* * * * *